(12) United States Patent
Chou

(10) Patent No.: US 7,349,029 B1
(45) Date of Patent: Mar. 25, 2008

(54) METHOD AND APPARATUS FOR DE-INTERLACING INTERLACED VIDEO FIELDS ORIGINATING FROM A PROGRESSIVE VIDEO SOURCE

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 644 days.

(21) Appl. No.: 11/038,327

(22) Filed: Jan. 19, 2005

(51) Int. Cl.
*H04N 7/01* (2006.01)
*H04N 11/20* (2006.01)
*H04N 5/14* (2006.01)
*H04N 9/64* (2006.01)

(52) U.S. Cl. ............... 348/448; 348/441; 348/449; 348/452; 348/458; 348/700; 348/701

(58) Field of Classification Search ......... 348/441, 348/448, 449, 452, 458, 700, 701
See application file for complete search history.

(56) References Cited

U.S. PATENT DOCUMENTS

| | | | |
|---|---|---|---|
| 4,876,596 A | 10/1989 | Faroudja | |
| 4,982,280 A | 1/1991 | Lyon et al. | |
| 5,689,301 A * | 11/1997 | Christopher et al. | 348/97 |
| 5,828,786 A * | 10/1998 | Rao et al. | 382/236 |
| 5,852,473 A | 12/1998 | Horne et al. | |
| 5,929,902 A | 7/1999 | Kwok | |
| 6,055,018 A * | 4/2000 | Swan | 348/448 |
| 6,111,610 A | 8/2000 | Faroudja | |
| 6,222,589 B1 * | 4/2001 | Faroudja et al. | 348/448 |
| 6,411,341 B1 * | 6/2002 | De Haan et al. | 348/714 |
| 6,580,463 B2 | 6/2003 | Swartz | |
| 6,661,464 B1 * | 12/2003 | Kokkosoulis et al. | 348/448 |
| 6,704,055 B1 | 3/2004 | He et al. | |
| 6,791,621 B2 * | 9/2004 | Fakhruddin et al. | 348/448 |
| 6,839,094 B2 * | 1/2005 | Tang et al. | 348/607 |
| 6,891,571 B2 * | 5/2005 | Shin et al. | 348/448 |
| 7,075,581 B1 * | 7/2006 | Ozgen et al. | 348/448 |
| 7,116,372 B2 * | 10/2006 | Kondo et al. | 348/448 |
| 7,116,828 B2 * | 10/2006 | Wells | 382/233 |
| 7,170,562 B2 * | 1/2007 | Yoo et al. | 348/452 |
| 7,224,399 B2 * | 5/2007 | Song | 348/452 |
| 7,256,835 B2 * | 8/2007 | Jiang et al. | 348/448 |
| 7,268,828 B2 * | 9/2007 | Mutoh | 348/555 |
| 7,286,185 B2 * | 10/2007 | Wong et al. | 348/452 |
| 2003/0189667 A1 * | 10/2003 | Chow | 348/441 |

(Continued)

*Primary Examiner*—Brian P. Yenke
(74) *Attorney, Agent, or Firm*—Pinnacle Patent Law Group

(57) ABSTRACT

A method for de-interlacing an interlaced video signal includes generating a per-field motion pattern set for a subject video field, where the motion pattern set comprises a same-parity motion pattern and an opposite-parity motion pattern pair, providing a plurality of progressive mode pattern pairs, where each progressive mode pattern pair is unique and characteristic of one of a plurality of progressive frame-to-interlaced field conversion techniques, and comparing the same-parity and opposite-parity motion pattern pair for the subject video field with each progressive mode pattern pair to determine whether the subject video field is derived from a progressive source and to identify the progressive frame-to-interlaced field conversion technique used. Based on the comparison, a field-merging de-interlacing technique or a per-pixel de-interlacing technique is utilized to de-interlace the subject field to produce a progressive video signal. In addition, based on the comparison, a display frame rate of the progressive video signal and the number of times to display a de-interlaced frame are also controlled.

32 Claims, 20 Drawing Sheets

U.S. PATENT DOCUMENTS

| | | |
|---|---|---|
| 2004/0070686 A1* | 4/2004 | Jung et al. ............... 348/448 |
| 2004/0135924 A1* | 7/2004 | Conklin ................... 348/448 |
| 2004/0189866 A1* | 9/2004 | Lin et al. .................. 348/452 |
| 2005/0036063 A1* | 2/2005 | Chen et al. ............... 348/452 |
| 2005/0078215 A1* | 4/2005 | Swartz ..................... 348/452 |
| 2005/0134735 A1* | 6/2005 | Swartz ..................... 348/554 |
| 2005/0195325 A1* | 9/2005 | Tanaka ..................... 348/448 |

* cited by examiner

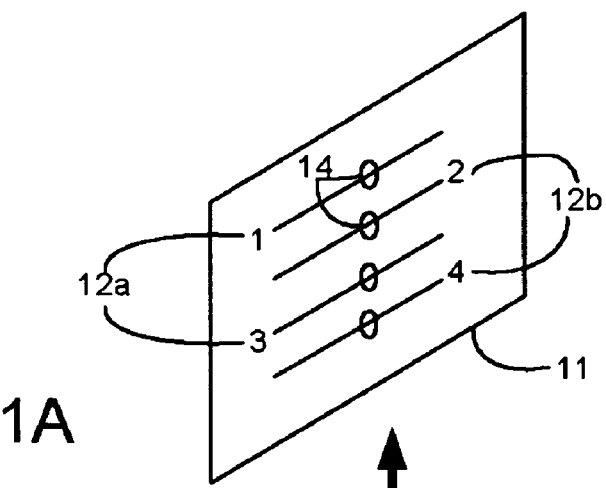
FIG. 1A
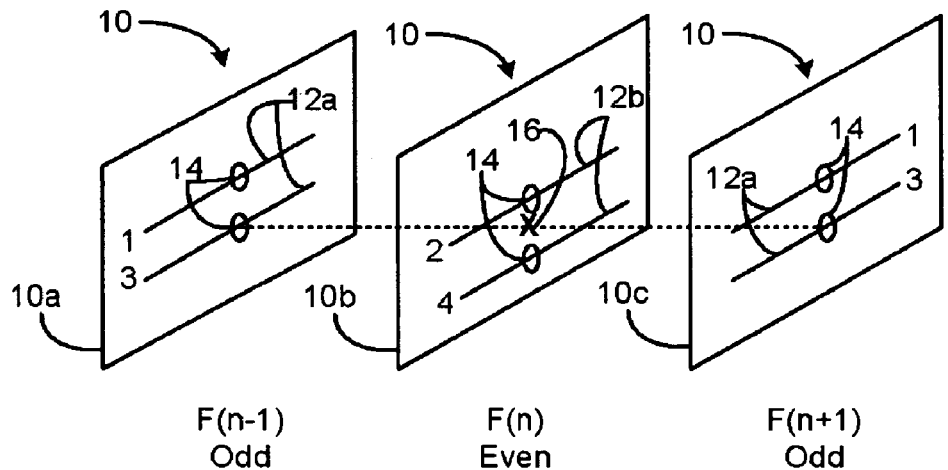
FIG. 1B
F(n-1) Odd     F(n) Even     F(n+1) Odd
FIG. 1C
(Prior Art)
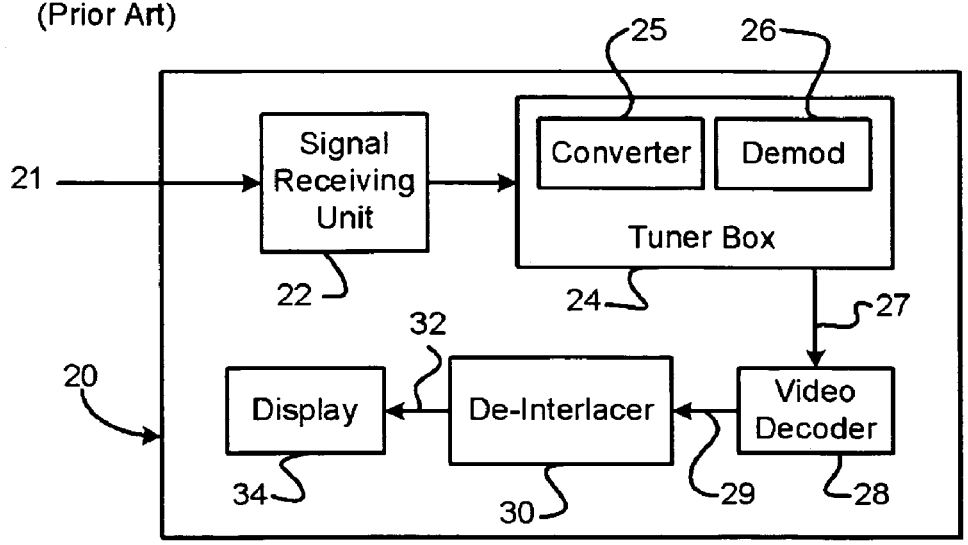

| Cycle Type | Pattern Number | Same-Parity Pattern | | | | | | Opposite-Parity Pattern | | | | | |
|---|---|---|---|---|---|---|---|---|---|---|---|---|---|
| 3:2 Cycle | 1 | 0 | 1 | 1 | 1 | 1 | 0 | 0 | 1 | 0 | 1 | 0 | 0 |
| | 2 | 1 | 1 | 1 | 1 | 0 | 1 | 1 | 0 | 1 | 0 | 0 | 1 |
| | 3 | 1 | 1 | 1 | 0 | 1 | 1 | 0 | 1 | 0 | 0 | 1 | 0 |
| | 4 | 1 | 1 | 0 | 1 | 1 | 1 | 1 | 0 | 0 | 1 | 0 | 1 |
| | 5 | 1 | 0 | 1 | 1 | 1 | 1 | 0 | 0 | 1 | 0 | 1 | 0 |
| 2:2 Cycle | 6 | 1 | 1 | 1 | 1 | 1 | 1 | 0 | 1 | 0 | 1 | 0 | 1 |
| | 7 | 1 | 1 | 1 | 1 | 1 | 1 | 1 | 0 | 1 | 0 | 1 | 0 |

FIG. 11A

| Cycle Type | Pattern Number | Same-Parity Mask | | | | | | Opposite-Parity Mask | | | | | |
|---|---|---|---|---|---|---|---|---|---|---|---|---|---|
| 3:2 Cycle | 1 | 1 | 1 | 1 | 1 | 1 | 1 | 1 | 1 | 1 | 1 | 1 | 1 |
| | 2 | 1 | 1 | 1 | 1 | 1 | 1 | 1 | 1 | 1 | 1 | 1 | 1 |
| | 3 | 1 | 1 | 1 | 1 | 1 | 1 | 1 | 1 | 1 | 1 | 1 | 1 |
| | 4 | 1 | 1 | 1 | 1 | 1 | 1 | 1 | 1 | 1 | 1 | 1 | 1 |
| | 5 | 1 | 1 | 1 | 1 | 1 | 1 | 1 | 1 | 1 | 1 | 1 | 1 |
| 2:2 Cycle | 6 | 0 | 0 | 0 | 0 | 0 | 0 | 1 | 1 | 1 | 1 | 1 | 1 |
| | 7 | 0 | 0 | 0 | 0 | 0 | 0 | 1 | 1 | 1 | 1 | 1 | 1 |

FIG. 11B

| Cycle Type | Pattern Number | Next Pattern |
|---|---|---|
| 3:2 Cycle | 1 | 2 |
| | 2 | 3 |
| | 3 | 4 |
| | 4 | 5 |
| | 5 | 1 |
| 2:2 Cycle | 6 | 7 |
| | 7 | 6 |

FIG. 14

METHOD AND APPARATUS FOR DE-INTERLACING INTERLACED VIDEO FIELDS ORIGINATING FROM A PROGRESSIVE VIDEO SOURCE

BACKGROUND

The present invention relates to digital image processing and more particularly to a method and apparatus for converting interlaced video fields into progressively scanned frames.

World wide video standards such as NTSC, PAL, and SECAM use interlaced video formats to maximize the vertical refresh rates while minimizing the required transmission bandwidth. In an interlaced video format, a picture frame is divided into fields, as shown in FIGS. 1A and 1B, which depicts a picture frame 11 divided into three (3) exemplary video fields 10. In each video field, e.g., 10a, a plurality of pixels 14 are arranged in scan lines 12a. The pixels 14 in one half of scan lines 12a of a picture frame are displayed on the screen during the first vertical scan period (i.e., the odd field 10a), while the pixels 14 in the other half of scan lines 12b, positioned halfway between those displayed during the first period, are displayed during the second vertical scan period (i.e., the even field 10b). While using an interlaced format provides the benefits mentioned above, it also can produce undesirable visual artifacts, such as line flicker and line crawling.

The visual artifacts can be minimized and the appearance of an interlaced image can be improved by converting it to a non-interlaced (progressive) format and displaying it as such. In fact, many newer display technologies, such as for example Liquid Crystal Displays (LCDs) and Plasma Display Panels (PDP), are designed to display progressively scanned video images, i.e., non-interlaced.

A conventional progressive video signal display system, e.g., a television (TV) or a projector, is illustrated in FIG. 1C. As is shown the display system 20 includes a signal receiving unit 22 that is coupled to a tuner box 24, and a video decoder 28. Signals, such as television signals, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29. As stated above, if the interlaced video signal 29 is displayed, undesirable visual artifacts, such as line flicker and line crawling, exist. Accordingly, a de-interlacer 30 is used to convert, i.e., de-interlace, the interlaced video signal 29 to generate a progressive video output signal 32. The progressive video output signal 32 is then displayed via an LCD or PDP 34.

Numerous methods have been proposed for de-interlacing an interlaced video signal to generate a progressive video signal. For instance, some methods perform a simple spatial-temporal de-interlacing technique, such as line repetition and field insertion. These methods, however, do not necessarily take into consideration motion between or within fields. For instance, it is well known that while line repetition is adequate for image regions having motion, line repetition is not suitable for stationary (still) image regions. By the same token, field insertion is a satisfactory de-interlacing method for stationary image regions, but inadequate for moving image regions. Therefore, utilizing one method presents a tradeoff between vertical spatial resolution and motion artifacts To address this issue, some de-interlacing methods are motion adaptive, i.e., they take into consideration the motion from field to field and/or from pixel to pixel in a field. Motion adaptive de-interlacing methods can dynamically switch or fade between different de-interlacing methods, such as between line repetition and field insertion. Per-field motion adaptive de-interlacing methods select a de-interlacing technique on a field-by-field basis. Thus, per-field de-interlacing methods do not maintain the overall quality throughout an image when there are both stationary and moving regions on it. Whereas, per-pixel de-interlacing methods select a de-interlacing technique on a pixel-by-pixel basis, thus providing a much better overall quality throughout an image.

Yet more de-interlacing methods are based on identifying the type of the source material from which the interlaced video signal was generated. For example, motion picture film or computer graphics (CG) signals are inherently progressive, i.e., non-interlaced. When the signals are transmitted for broadcasting, the signals are converted into interlaced video signals according to standards such as NTSC and PAL. Well known techniques such as 3:2 pull-down or 2:2 pull-down are used to break the original progressive frames into interlaced video fields while maintaining the correct frame rate. Progressively scanned video sources such as those shot by progressively scanned electronic cameras are inherently progressive in nature but are transmitted in interlaced formats according to standards such as NTSC and PAL, or via progressive segmented frame (PsF) transport in ITU-R BT.7094 standard. De-interlacing such signals originating from such non-interlaced (progressive) sources can be achieved with high quality if the original progressive frame sequences can be identified and reconstructed correctly. Thus, by recognizing that a video sequence originates from a progressive source, the original progressive frames can be reconstructed exactly by merging the appropriate video fields.

Unfortunately, most video transmission formats do not include explicit information about the type of source material being carried, such as whether the material was derived from a progressive source. Thus, in order for a video processing device to exploit the progressive nature of film, CG, or PsF sources, it is first necessary to determine whether the material originates from a progressive source. If it is determined that the material originates from such a source, it is furthermore necessary to determine precisely which video fields originate from which source frames.

Typically, the progressive nature of the source of the interlaced video signal can be determined by examining the motion between fields of an input video sequence. It is well known that a 3:2 pull-down conversion produces a characteristic motion pattern or cadence between same-parity fields, and that a 2:2 pull-down conversion produces another characteristic motion pattern between opposite-parity fields. Accordingly, when such a pattern or cadence is detected, the de-interlacer can enter a "progressive source mode". Nevertheless, comparing motion between same-parity fields only (or opposite-parity fields only) can be unreliable and can result in false detections or missed detections. In both cases, the resulting progressive video output can exhibit undesirable visual artifacts because of inappropriate field merging (false detection) or non-optima; per-pixel interpolation (missed detection). This results in degraded video quality, e.g., feathering and loss of vertical resolution, for the progressive video output. Moreover, if the interlaced input video signal is derived from a conversion process other than a 3:2 or 2:2 pull down or if the source signal is more complex than a pure progressive frame, e.g., a film/video overlap, cross-fade, or split screen, the cadence based detection method cannot reliably detect the nature of the progressive source and the quality of the resultant progressive video output will suffer.

Accordingly there exists a need for an improved process and apparatus for converting an interlaced video signal originating from a progressive source into a progressively scanned video signal. The method and apparatus should be able to minimize visual artifacts resulting from motion and should be relatively easy to implement.

SUMMARY

In one version, a method for de-interlacing an interlaced video signal includes generating a per-field motion pattern set for a subject video field, where the motion pattern set comprises a same-parity motion pattern and an opposite-parity motion pattern, providing a plurality of progressive mode pattern pairs, where each progressive mode pattern pair is unique and characteristic of one of a plurality of progressive frame-to-interlaced field conversion techniques, and comparing the motion pattern set for the subject video field with each progressive mode pattern pair to determine whether the subject video field is derived from a progressive source and to identify the progressive frame-to-interlaced field conversion technique used. Based on the comparison, a field-merging de-interlacing technique or a per-pixel de-interlacing technique is utilized to de-interlace the subject field to produce a progressive video signal. In one version, a frame rate of the progressive video signal and the number of times to display a de-interlaced frame are also determined based on the comparison.

In another version, a de-interlacing system for de-interlacing an interlaced video signal includes a motion detection unit for generating a per-field motion pattern pair for a subject video field and a progressive source identification unit. The progressive source identification unit includes a plurality of progressive mode pattern pairs, where each progressive mode pattern pair is unique and characteristic of one of a plurality of progressive frame-to-interlaced field conversion techniques, a motion data matching unit for comparing the motion pattern pair for the subject video field with each progressive mode pattern pair to determine whether the subject video field is derived from a progressive source and to identify the conversion technique used, and a state machine unit for generating a de-interlacing command, based on the comparison, to utilize a field-merging de-interlacing technique or a per-pixel de-interlacing technique to de-interlace the subject field to produce a progressive video signal. In another version, the state machine also generates a frame rate converting command to control the frame rate of the progressive video signal and the number of times a subject frame is displayed. The de-interlacing system further includes a video processing unit for receiving and executing the commands, and for outputting the progressive video signal.

In another version, a progressive scan display system includes a signal receiving unit, a tuner box for transforming the signal into an analog signal, a video decoder for transforming the analog signal into a plurality of interlaced video fields, and a de-interlacing system for converting the interlaced video fields into a progressive video signal. The de-interlacing system includes a motion detection unit for generating a per-field motion pattern pair for a subject video field, a progressive source identification unit that determines whether the subject video field is derived from a progressive source, identifies which progressive frame-to-interlaced field conversion technique was used based on the per-field motion pattern pair for a subject video field, and generates a de-interlacing command to utilize a field-merging de-interlacing technique or a per-pixel de-interlacing technique to de-interlace the subject field to produce a progressive video signal and a frame rate converting command to control the frame rate of the progressive video signal and the number of times a de-interlaced frame is displayed, and a video processing unit for receiving and executing the commands, and for outputting the progressive video signal. The progressive scan display system further includes a display for displaying the progressive video signal.

DRAWINGS

These features, aspects and advantages of the present invention will become better understood with regard to the following description, appended claims, and accompanying drawings, which illustrate examples of the invention. Nevertheless, it is to be understood that each of the features can be used in the invention in general, not merely in the context of the particular drawings, and the invention includes any combination of these features, where:

FIG. 1A depicts an exemplary picture frame;

FIG. 1B depicts exemplary interlaced video fields;

FIG. 1C illustrates a conventional progressive video signal display system;

Figure 8A:
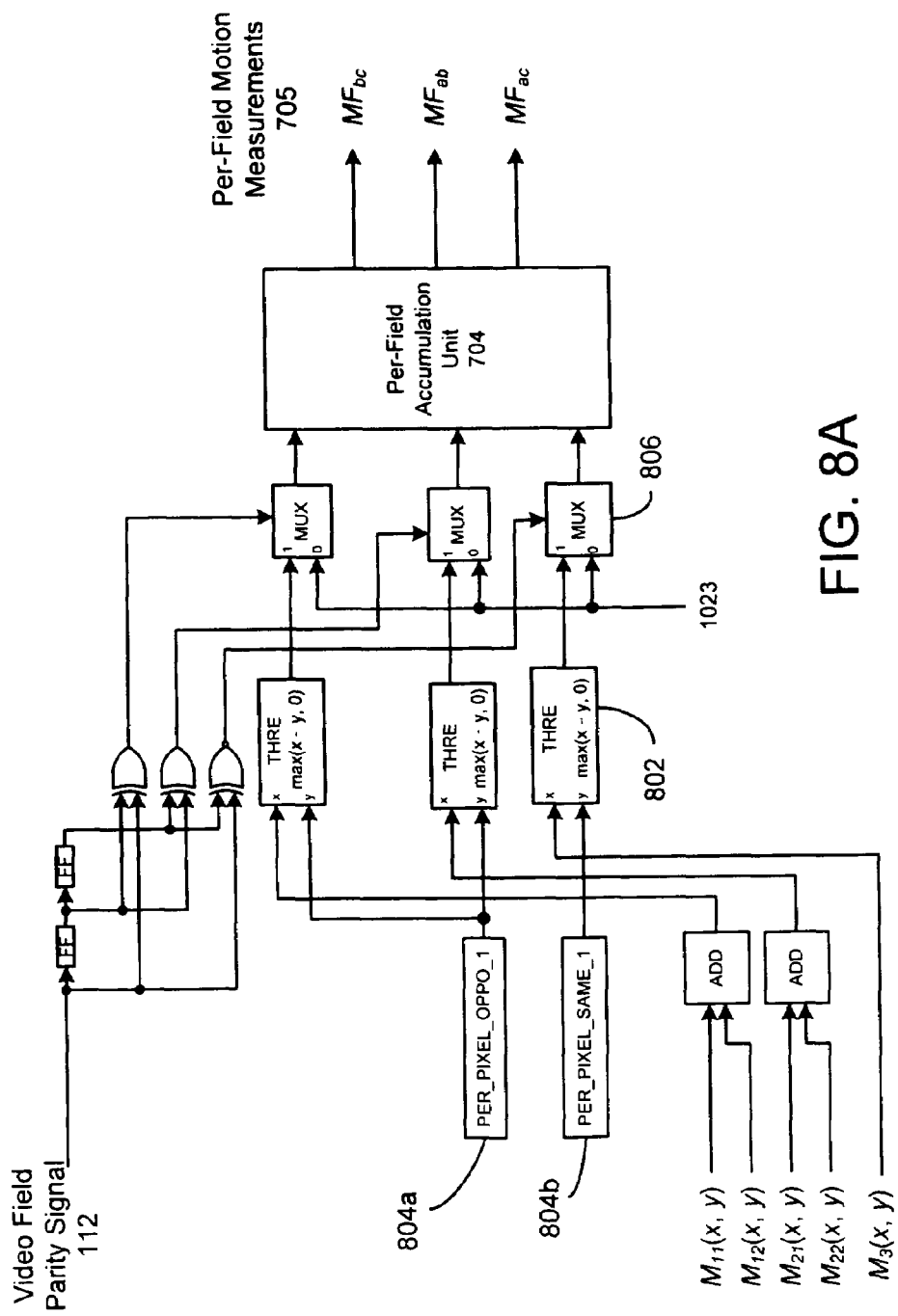
Figure 8B:
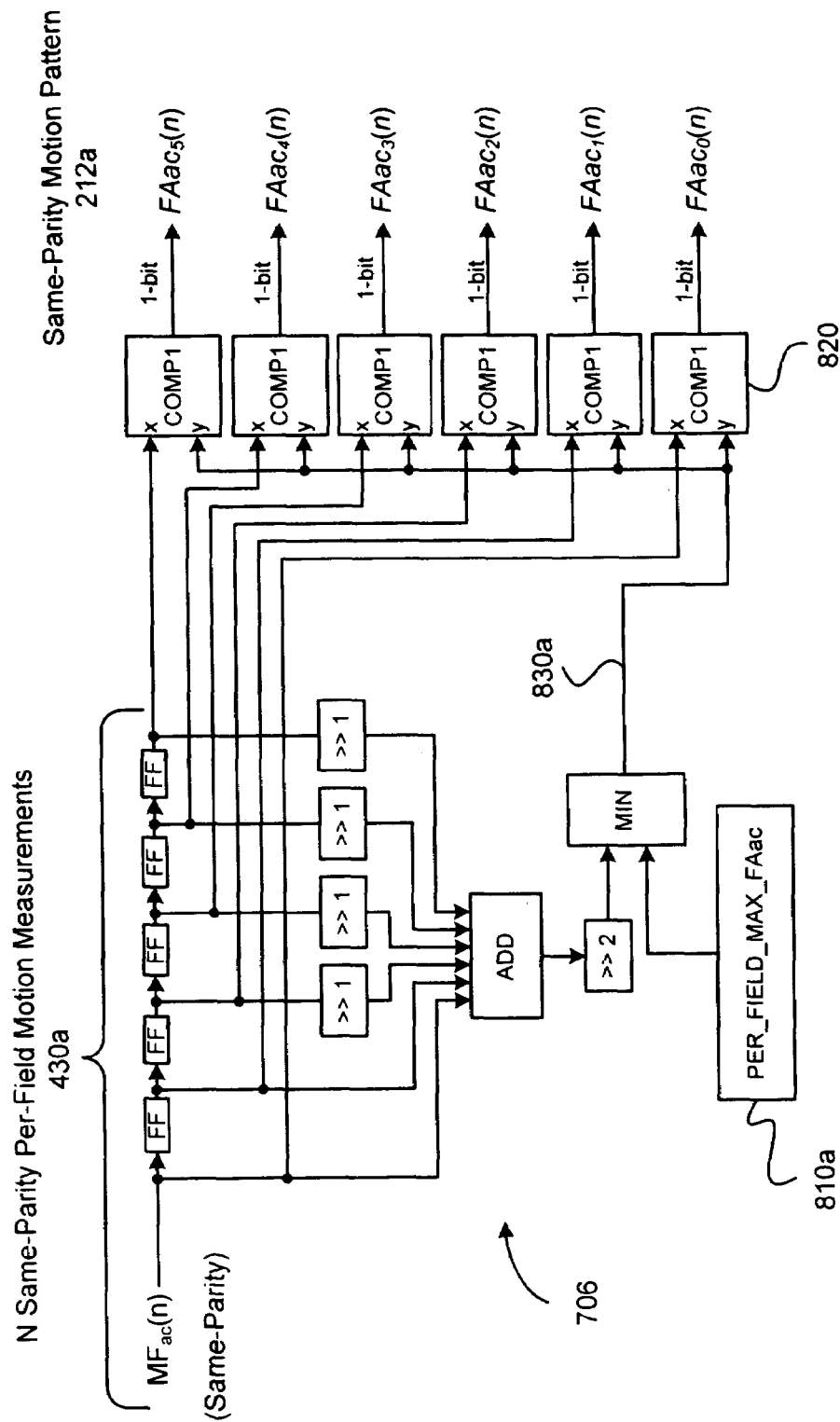
Figure 8C:
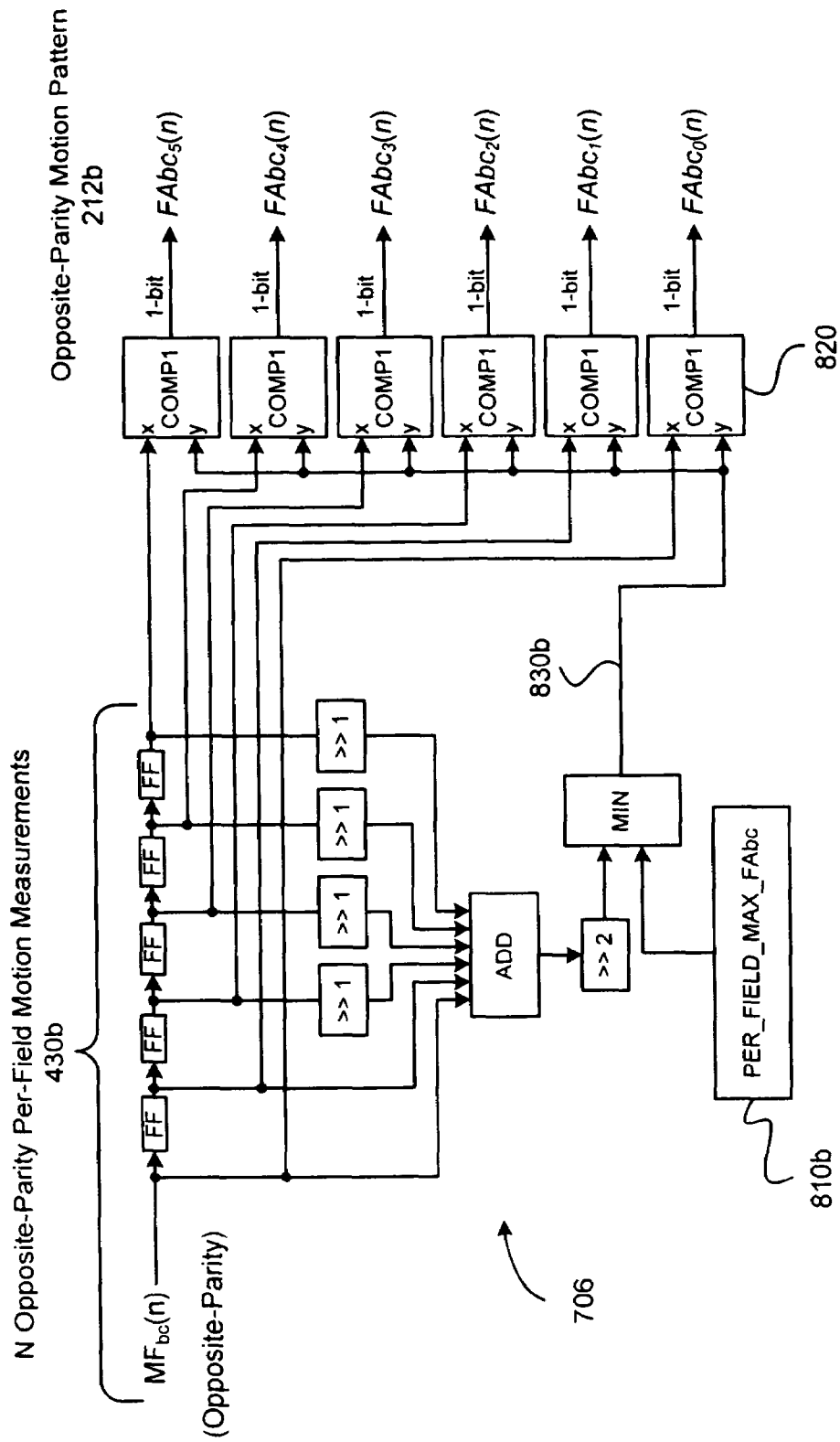
Figure 8D:
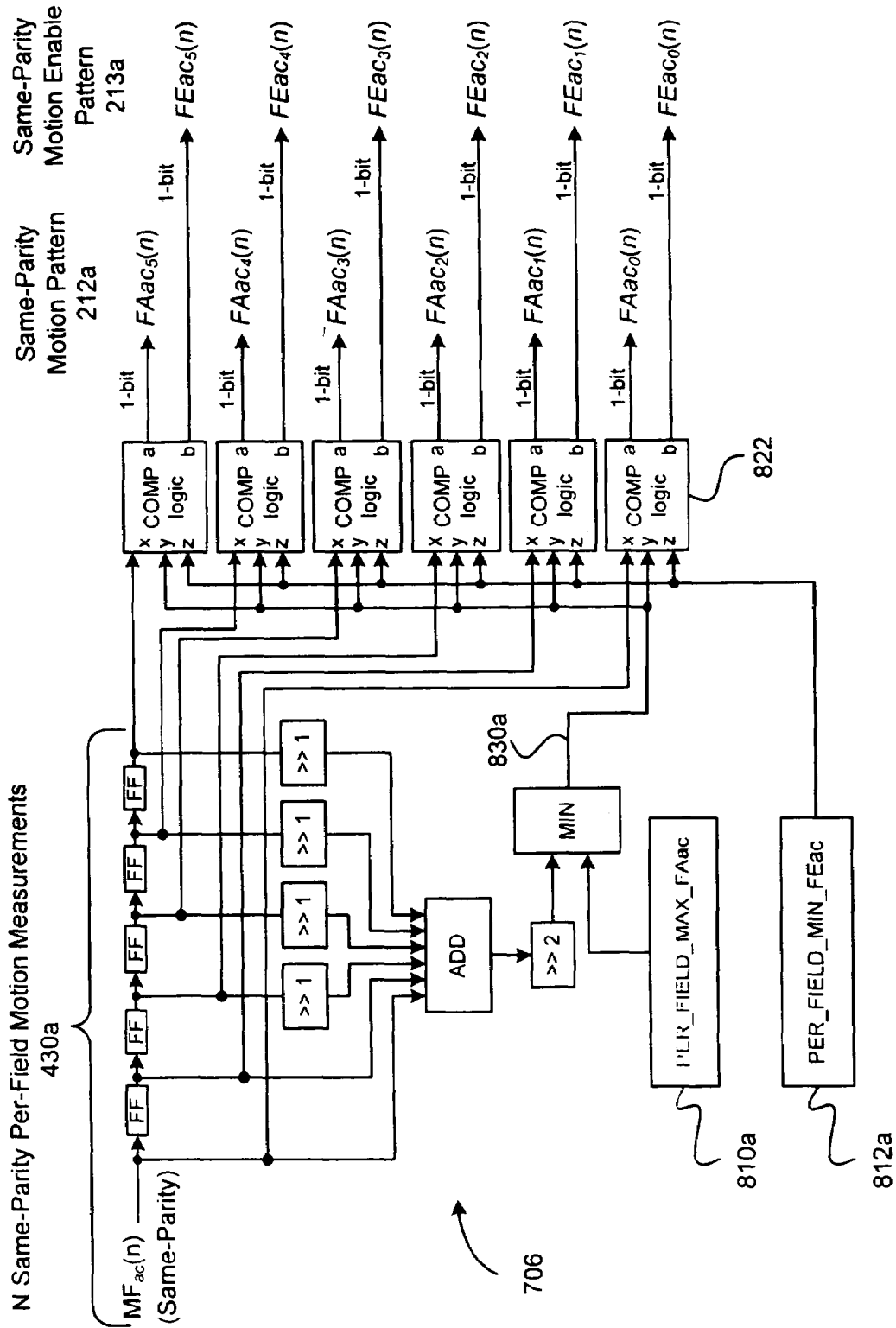
Figure 8E:
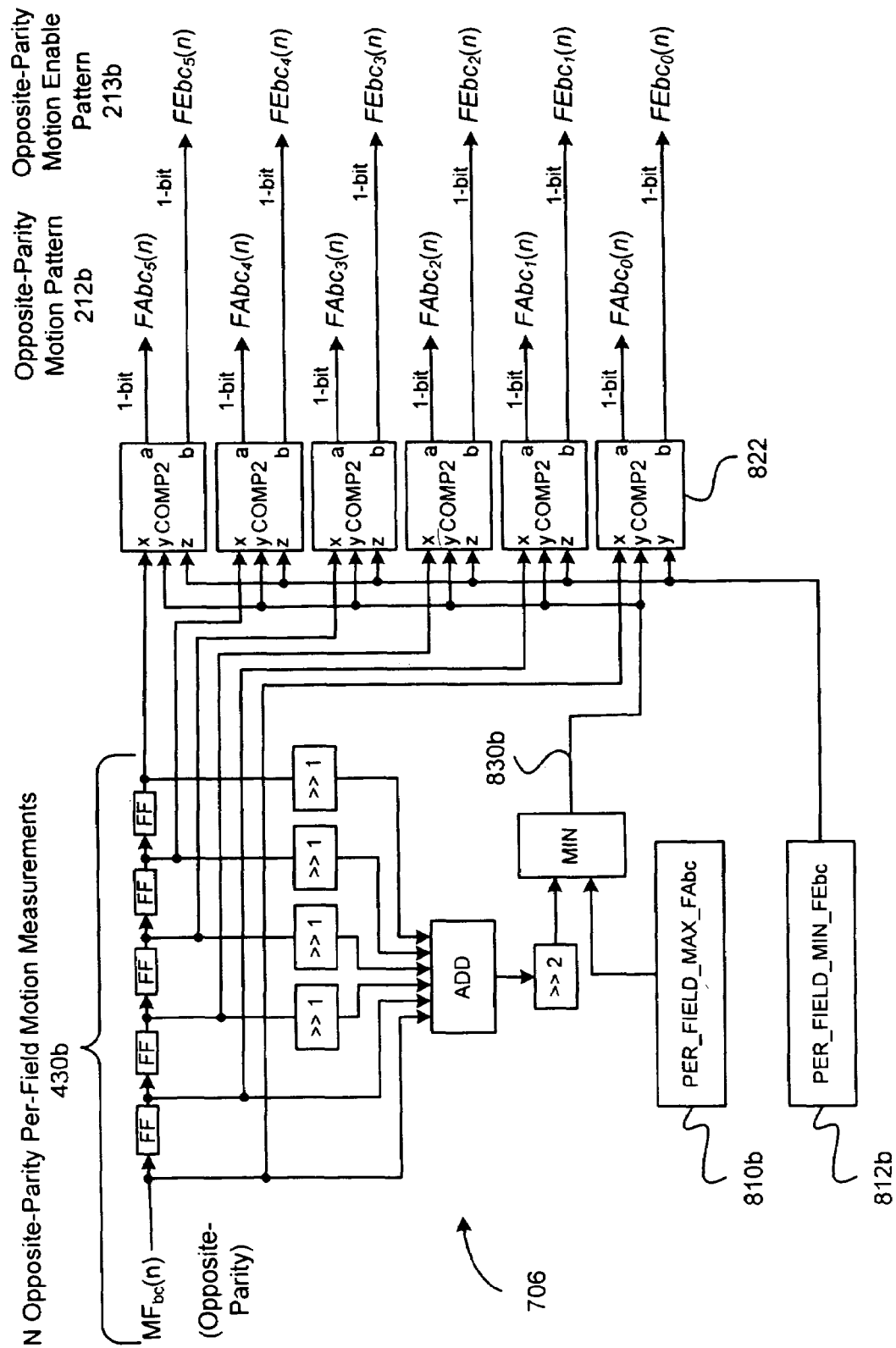
Figure 8F:
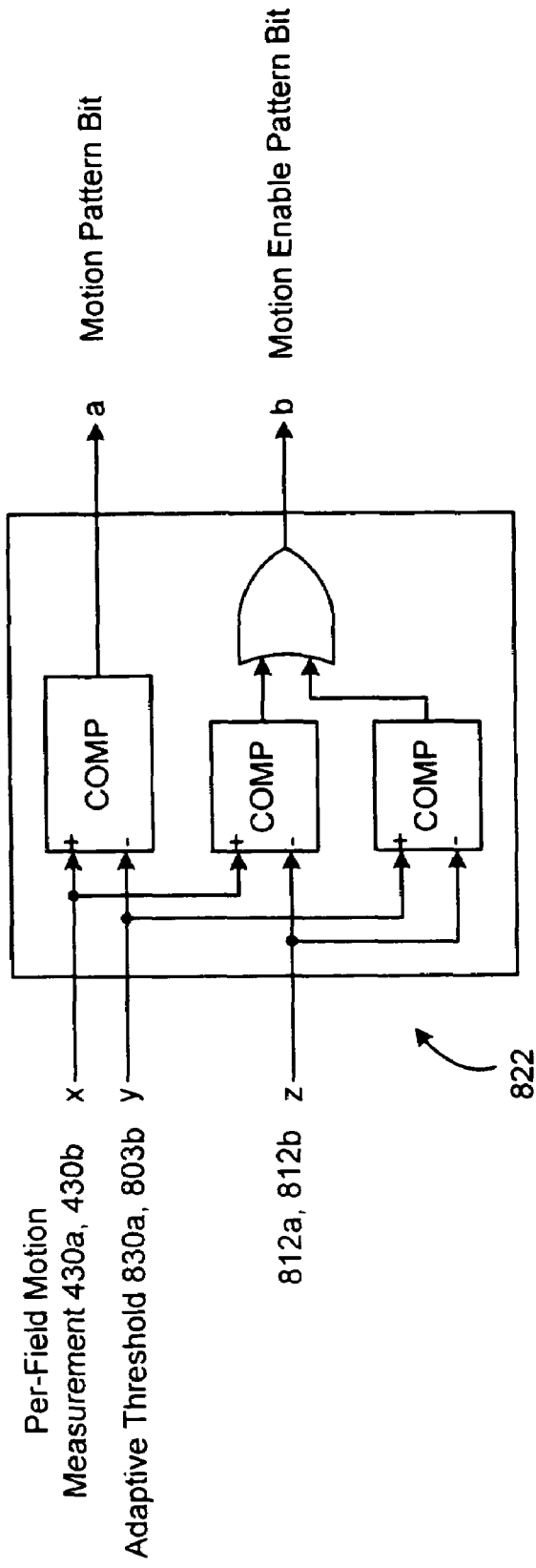
Figure 9:
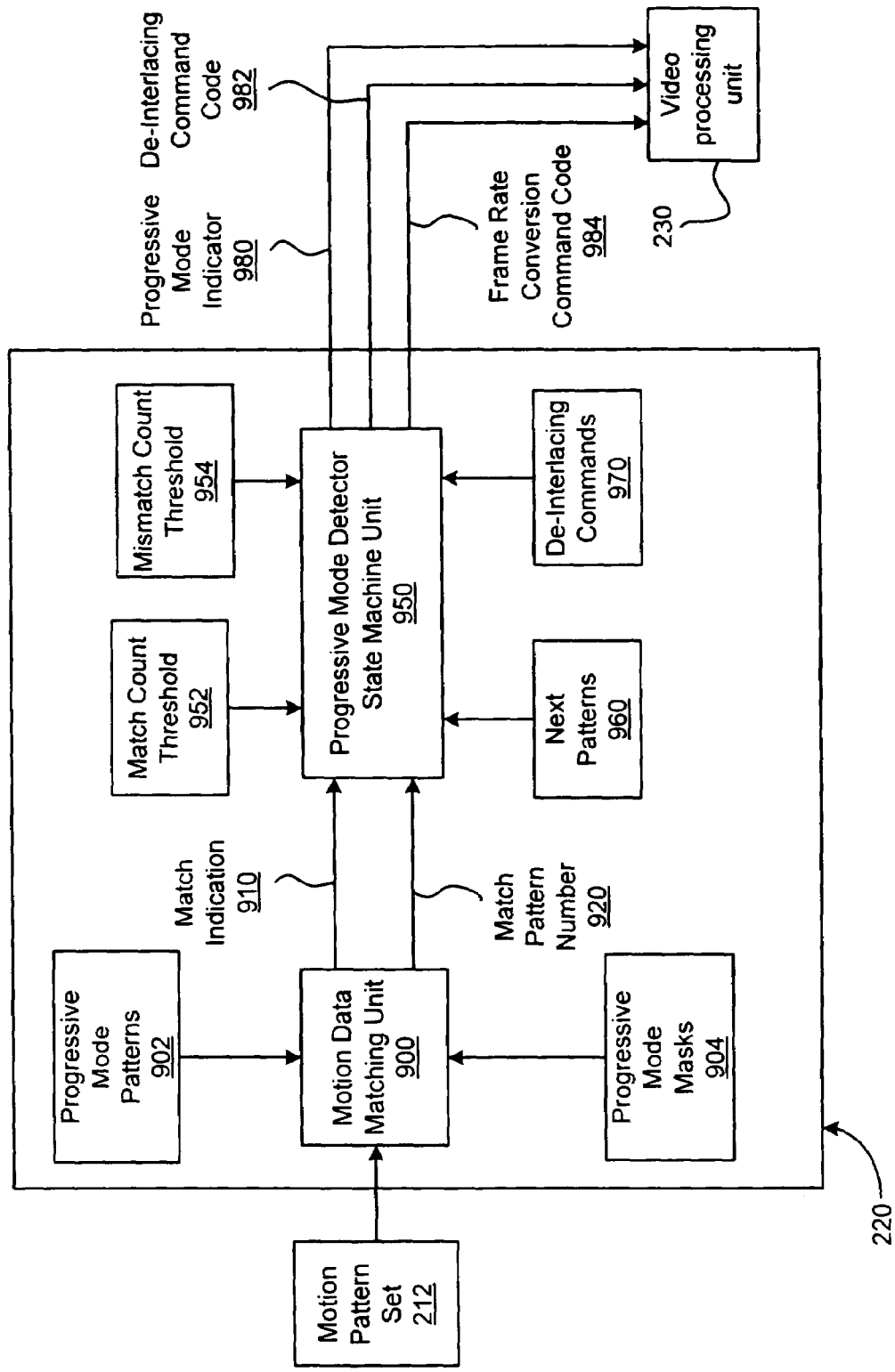
Figure 10:
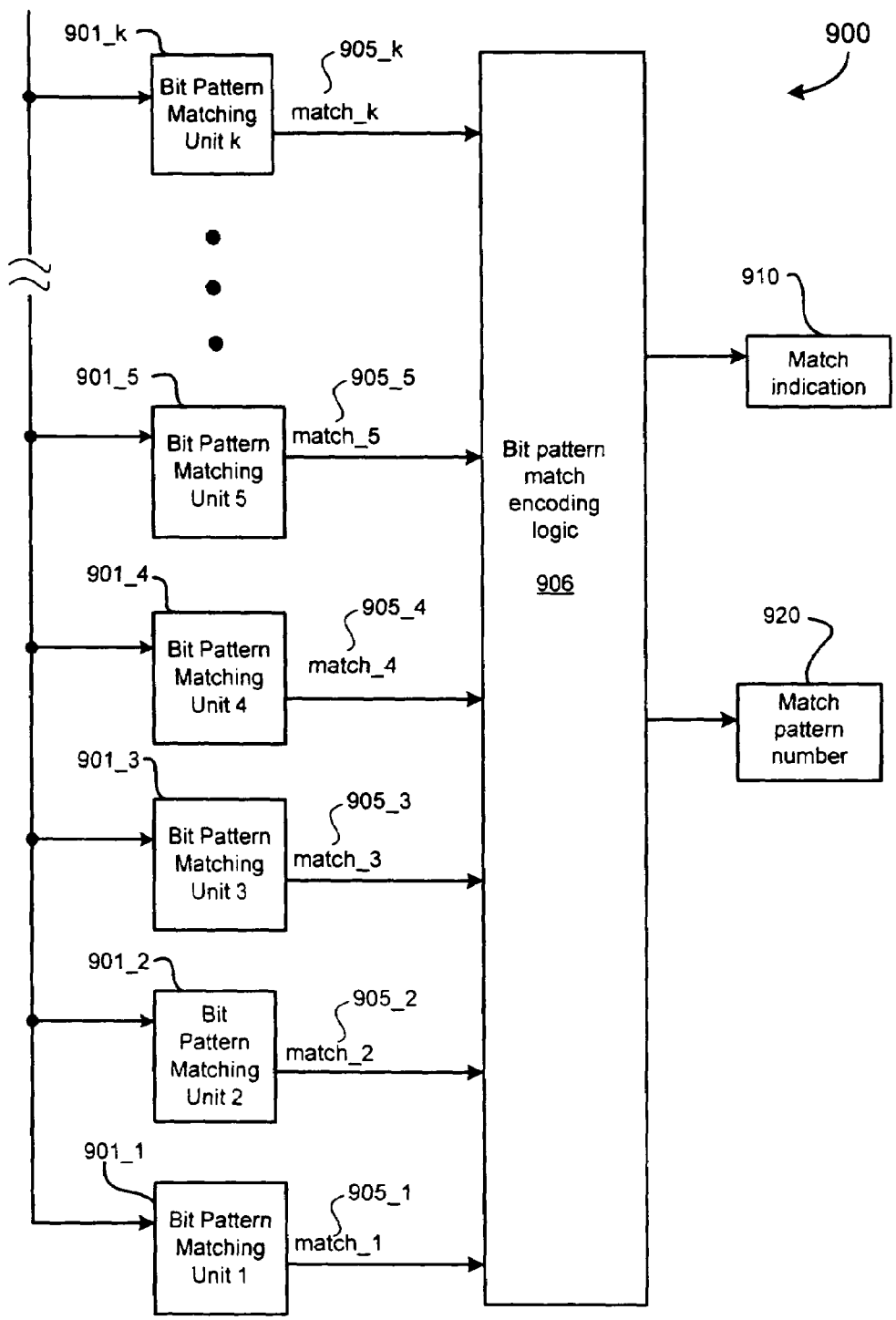
Figure 12:
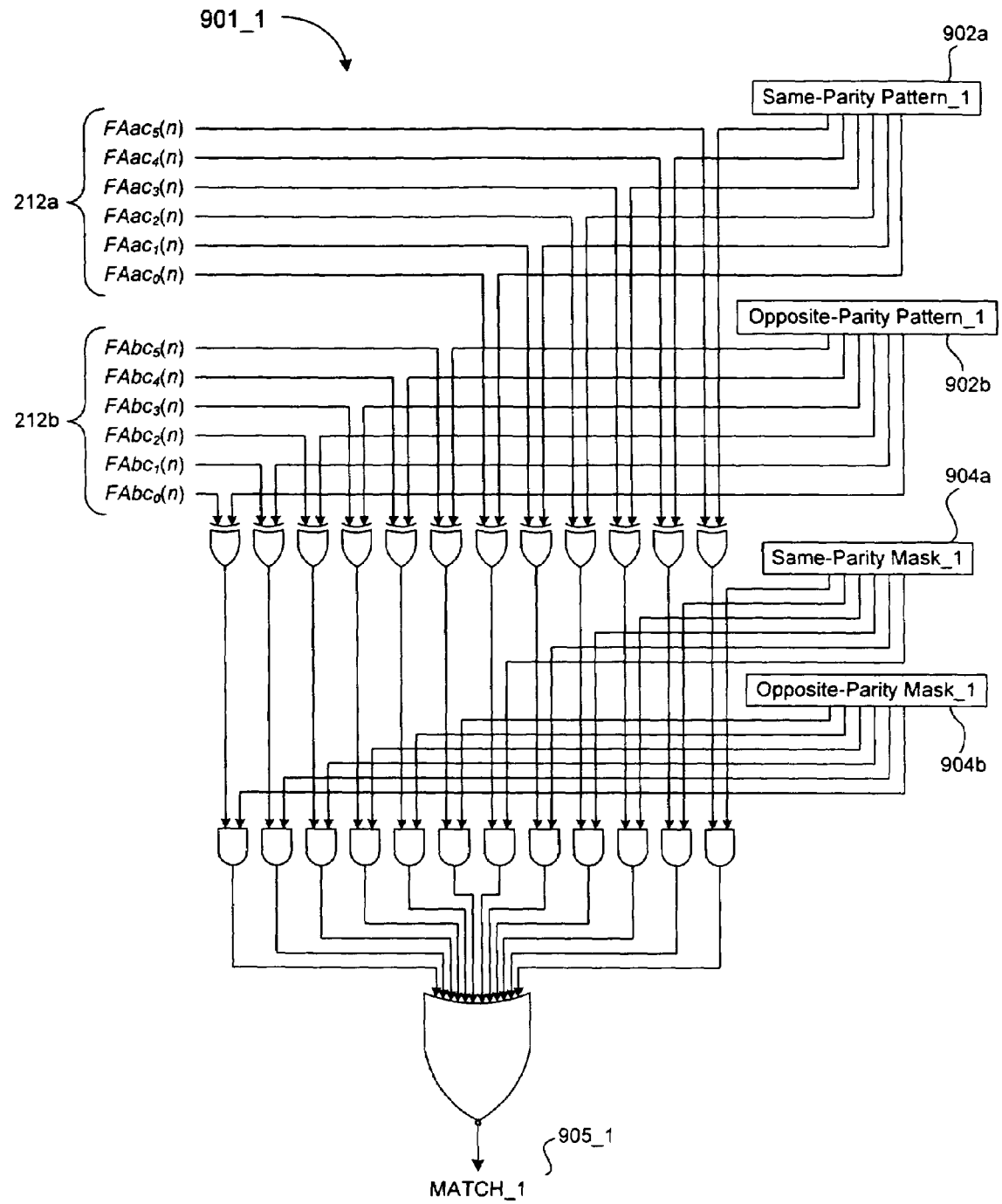
Figure 13:
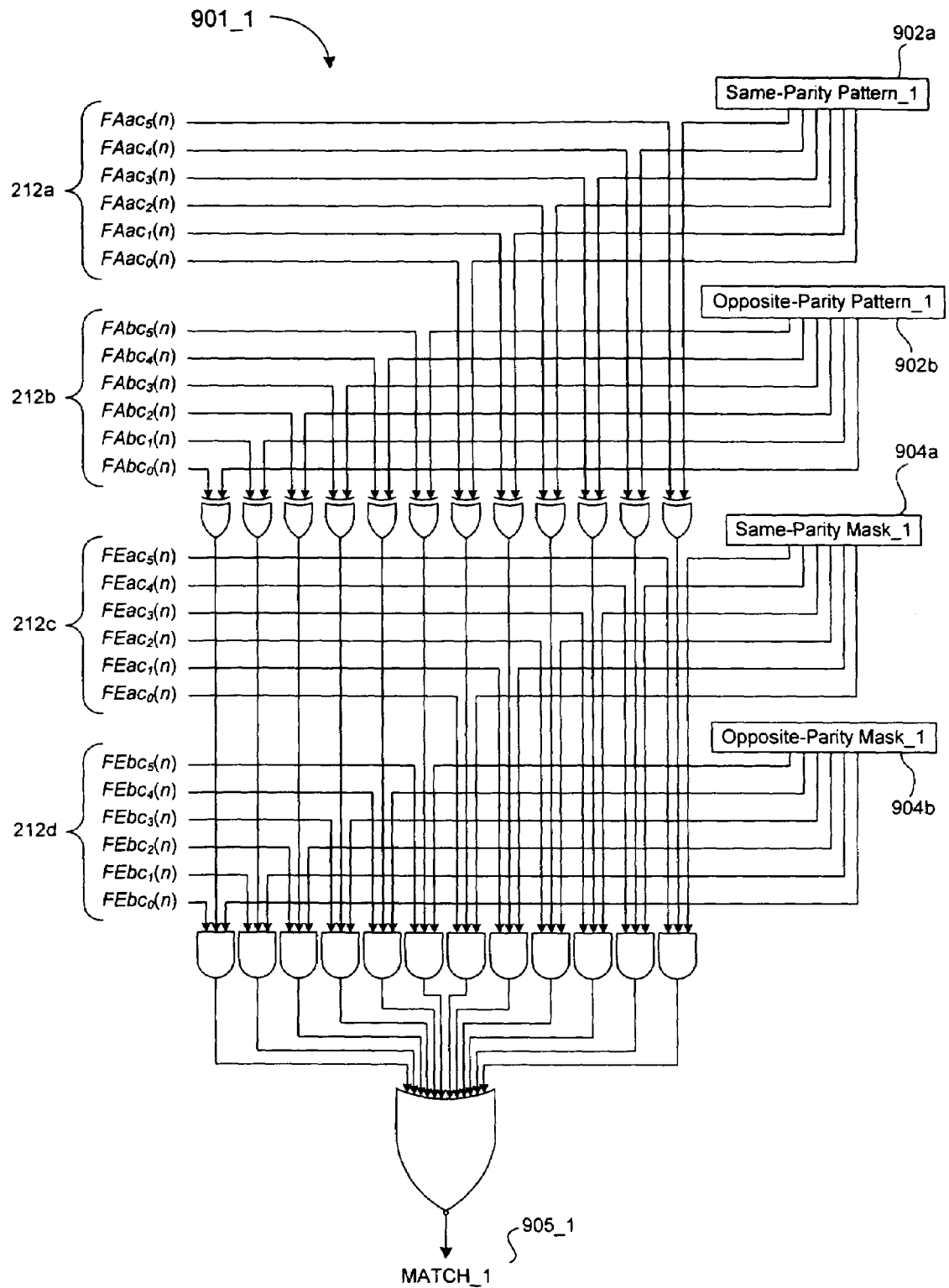
Figure 15:
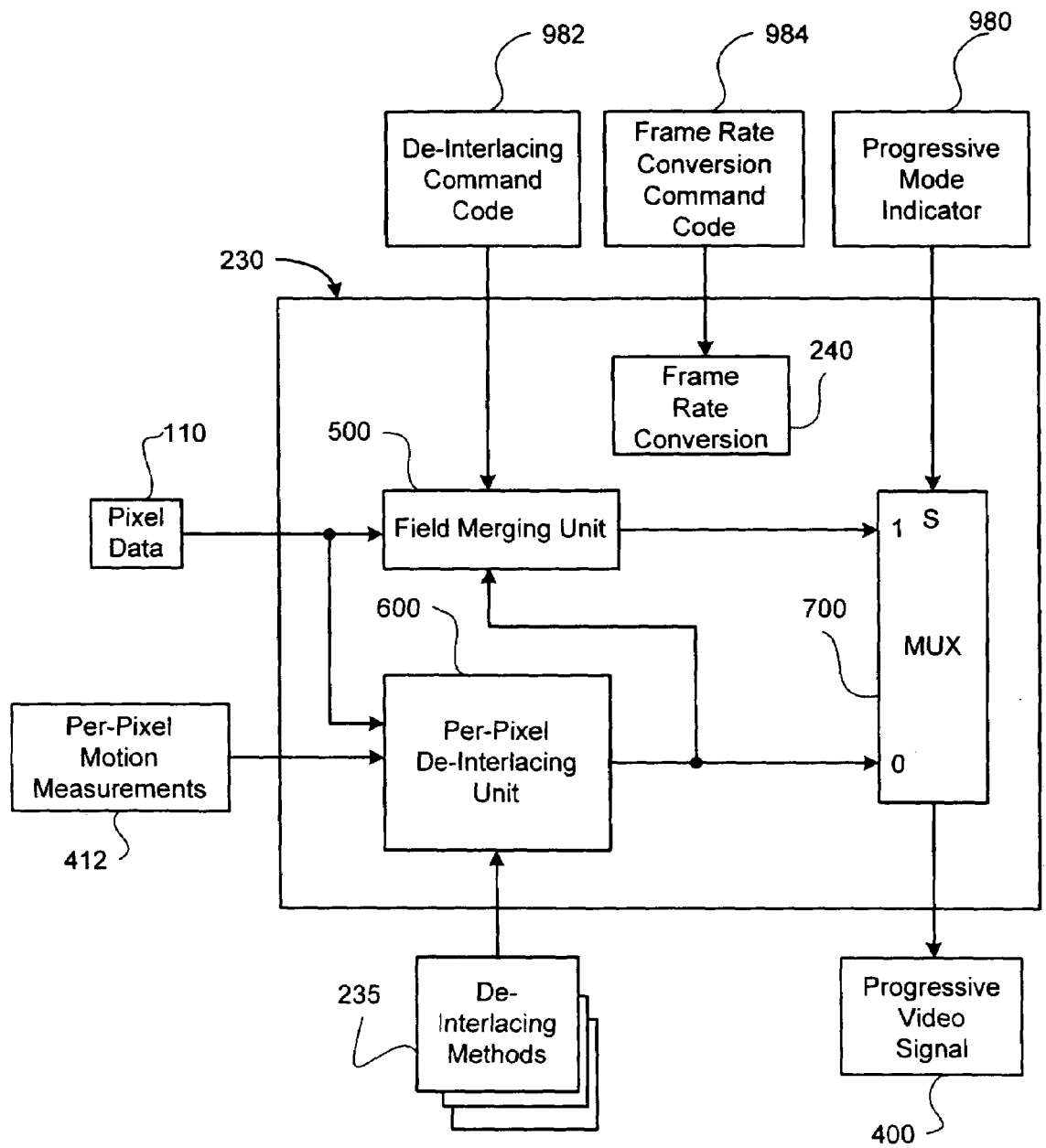
Figure 16:
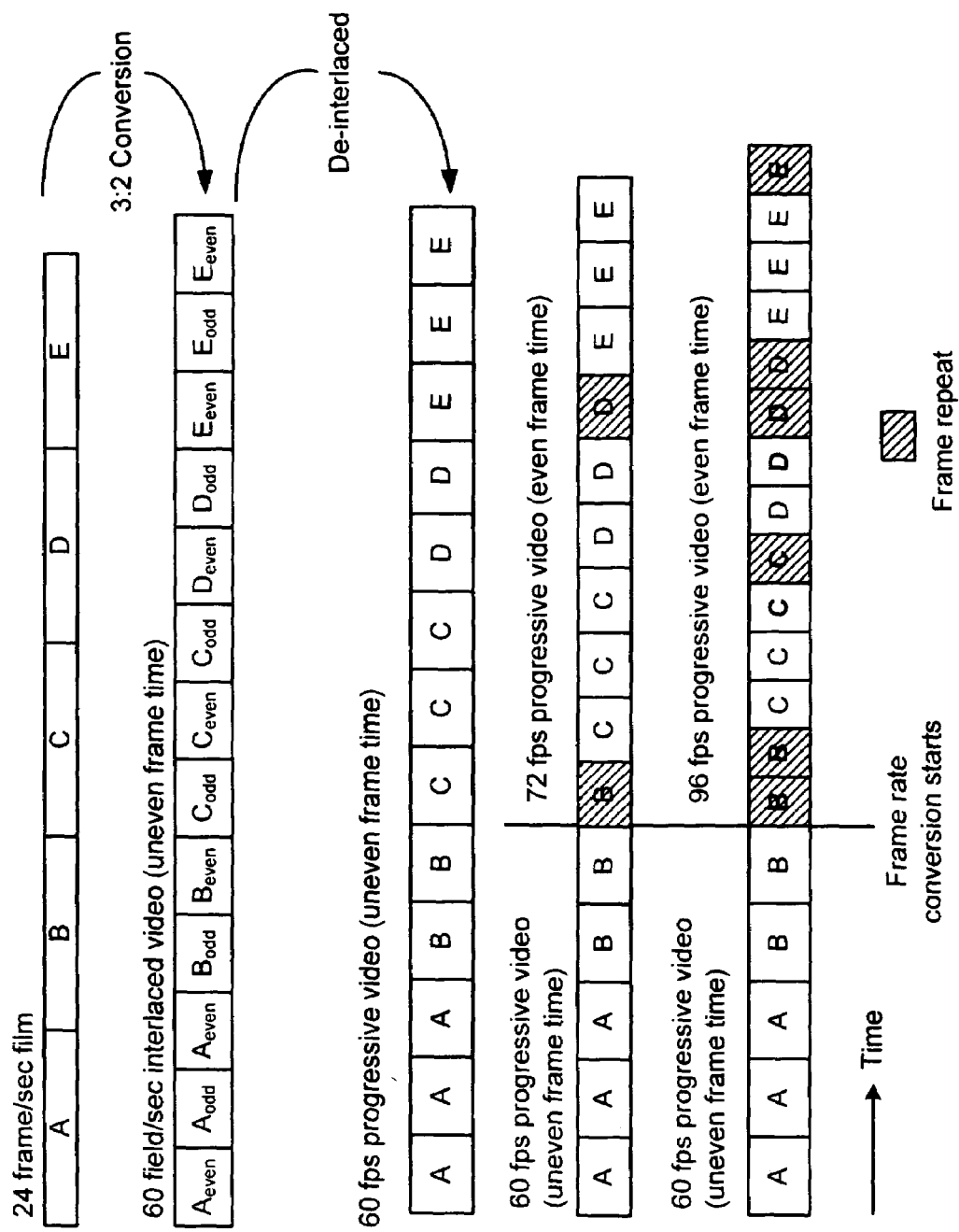
Figure 17:
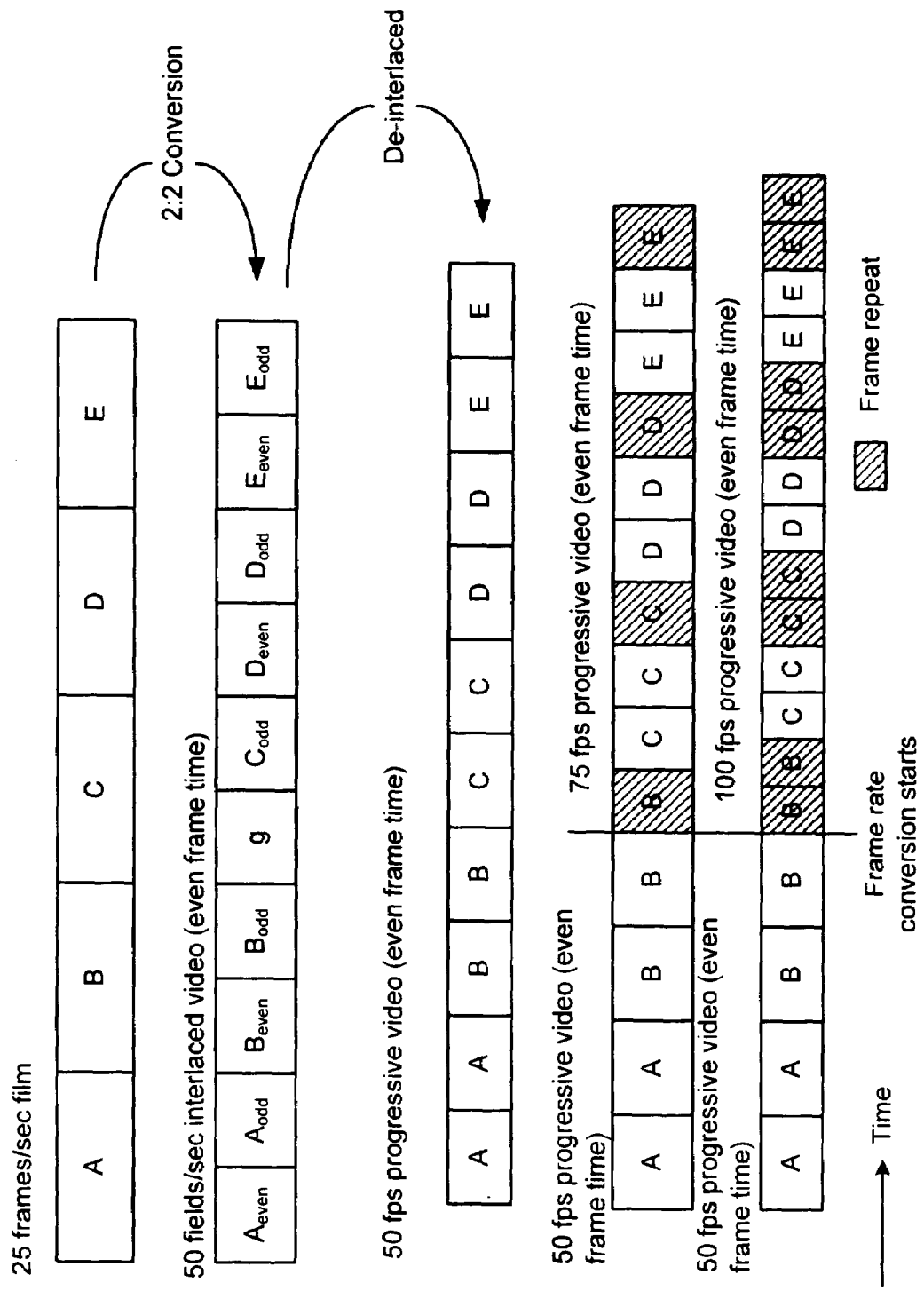

FIGS. 8A, 8B, 8C, 8D and 8E collectively illustrate exemplary logic diagrams of the per-field motion data processing unit according to versions of the present invention;

FIG. 8F illustrates an exemplary logic diagram of a comparator logic according to a version of the present invention;

FIG. 9 is a schematic block diagram of the progressive source identification unit according to a version of the present invention;

FIG. 10 is a schematic block diagram of the motion data matching unit according to a version of the present invention;

FIGS. 11A and 11B illustrate exemplary progressive mode patterns and masks according to a version of the present invention;

FIG. 12 is an exemplary logic diagram of one bit pattern matching unit according to one version;

FIG. 13 is an exemplary logic diagram of one bit pattern matching unit according to another version;

FIG. 14 illustrate exemplary next patterns according to a version of the present invention;

FIG. 15 is a schematic block diagram of the video processing unit according to a version of the present invention;

FIG. 16 illustrates idealized timing diagrams describing the operation of de-interlacing and frame rate conversion of a 3:2 pull-down progressive source according to a version of the present invention; and FIG. 17 illustrates idealized timing diagrams describing the operation of de-interlacing and frame rate conversion of a 2:2 pull-down progressive source according to a version of the present invention.

DESCRIPTION

The present invention relates to digital image processing and more particularly to a method and apparatus for converting an interlaced video field into a progressively scanned frame. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is to be accorded the widest scope consistent with the principles and features described herein.

Figure 2:
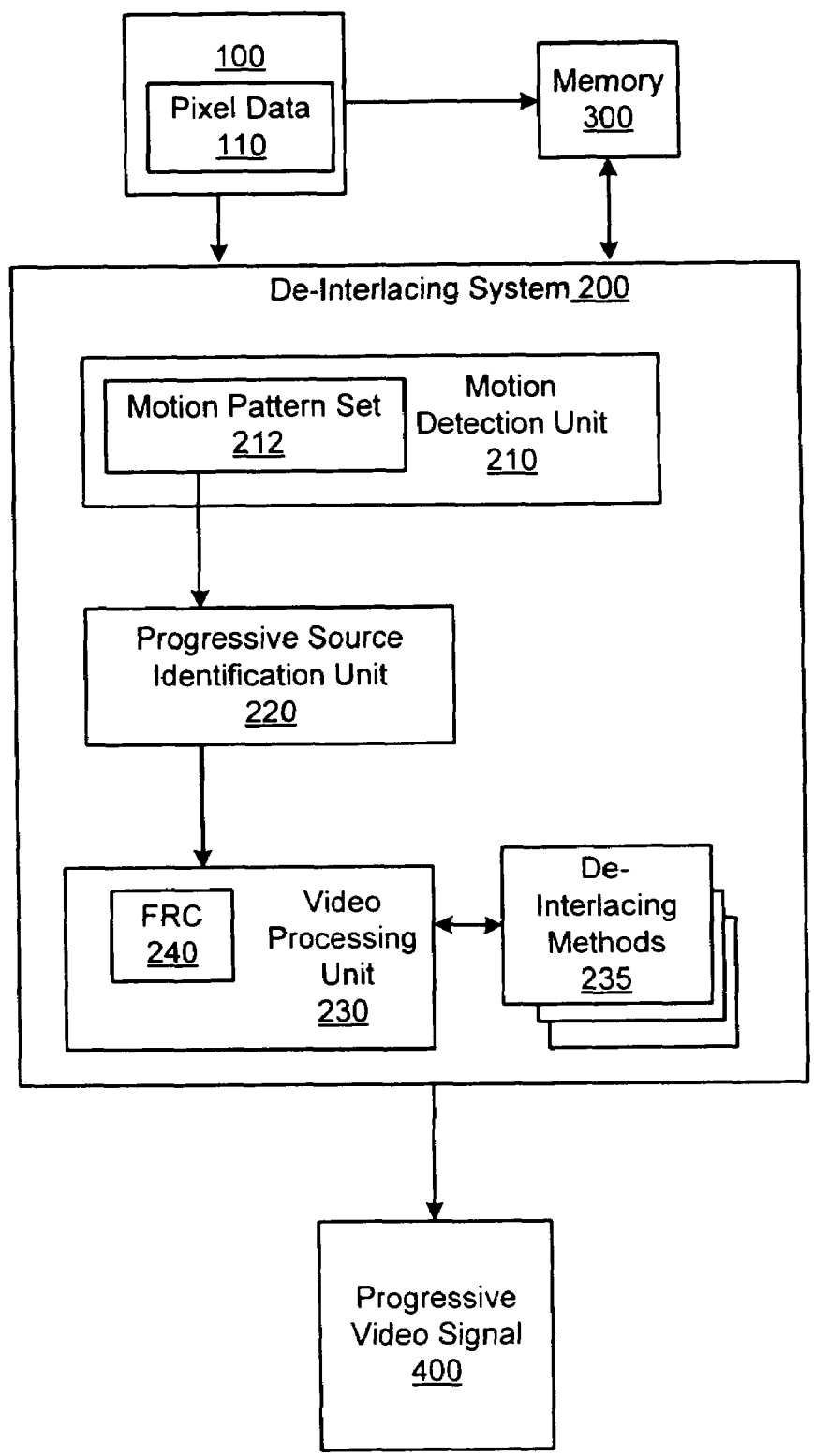
FIG. 2 is a schematic block diagram of a de-interlacing system that can be utilized according to one version of the present invention.

FIG. 2 is a schematic block diagram of an interlaced-to-progressive scan conversion (i.e., de-interlacing) system that can be utilized according to one version of the present invention. The de-interlacing system 200 receives an input video signal 100 from a subject video field, e.g., 10b, and outputs a progressive video signal 400 corresponding to the subject field 10b. The system 200 is coupled to a memory module 300 that can be external or internal to the system 200. The memory module 300 is used to receive and store data that can be accessed by the de-interlacing system 200 during the de-interlacing process.

The de-interlacing system 200 comprises a motion detection unit 210, a progressive source identification unit 220, and a video processing unit 230. The motion detection unit 210 processes the input signal 100 and generates a per-field motion pattern set 212 that represents motion levels for the subject field as well as a plurality of preceding video fields 10. The progressive source identification (PSI) unit 220 analyzes the per-field motion pattern set 212 and determines whether the input signal 100 is derived from a progressive source, e.g., film, CG, or PsF. If the motion pattern set 212 indicates a progressive source, the PSI unit 220 can determine which video fields 10 can be merged to correctly reconstruct the progressive frames 11, can determine which progressive frames should be repeated if the input frame rate is converted to a higher output frame rate, and instructs the video processing unit 230 to merge the fields 10 and perform frame rate conversion. If, however, the motion pattern set 212 does not indicate a progressive source, the PSI unit 220 can instruct the video processing unit 230 to utilize a per-pixel interpolation method 235 to generate values for each missing target pixel 16 in the subject field 10b.

Various methods and systems that perform the per-pixel interpolation can be utilized in cooperation with the PSI unit 220. Nevertheless, it is preferable to utilize the video processing unit 230 described in commonly assigned U.S. patent application Ser. No. 11/019,017, entitled "Method and Apparatus for Per-Pixel Motion Adaptive De-interlacing of Interlaced Video Fields," filed on Dec. 20, 2004, and herein incorporated by reference in its entirety. There, the video processing unit 230 includes at least one look up table that includes a plurality of de-interlacing methods 235 associated with a plurality of motion data values related to missing pixels 16. The video processing unit 230 utilizes the lookup table to select an optimal de-interlacing method 235 to generate a value for a missing target pixel 16.

Referring again to FIG. 2, the video processing unit 230 also includes a frame rate up-converter (FRC) 240. The FRC 240 analyzes the frame rate of the input signal 100, and if needed, adjusts the progressive video output signal 400 such that the output frame rate is appropriate for a system, e.g., a display 34, downstream from the de-interlacing system 200. Typically, if the input signal 100 is derived from a progressive source having a known frame rate, e.g., 24 frames-per-second (fps), the output frame rate can be an integral multiple of the known frame rate of the detected progressive source, e.g., 72 fps, in order to minimize motion judder artifacts due to uneven film frame times in film-to-video conversions. The implementation and functionality of the FRC 240 will be described later.

Figure 3:
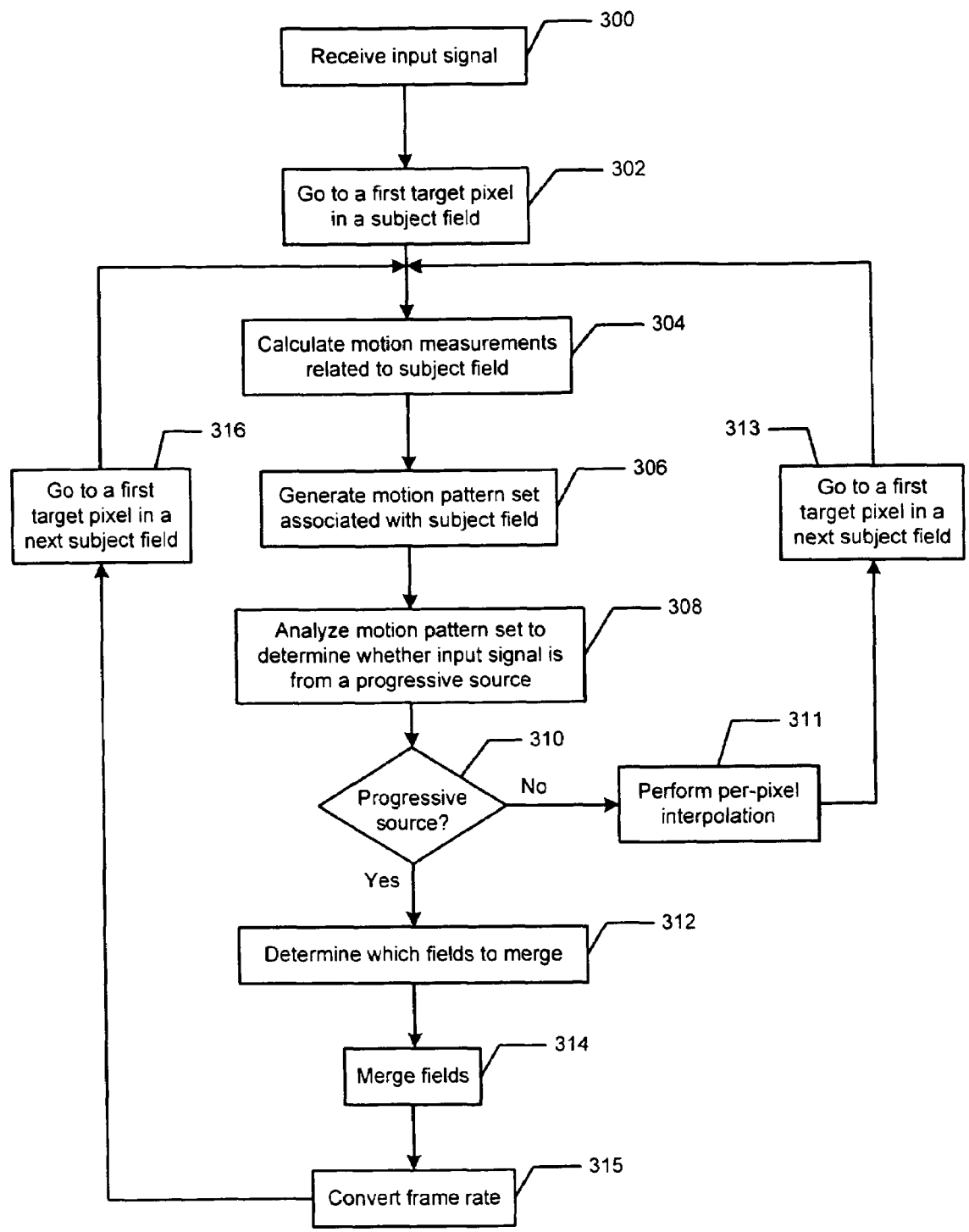
FIG. 3 is a flowchart illustrating a process for de-interlacing the input video signal from interlaced fields according to one version of the present invention.
Figure 4:
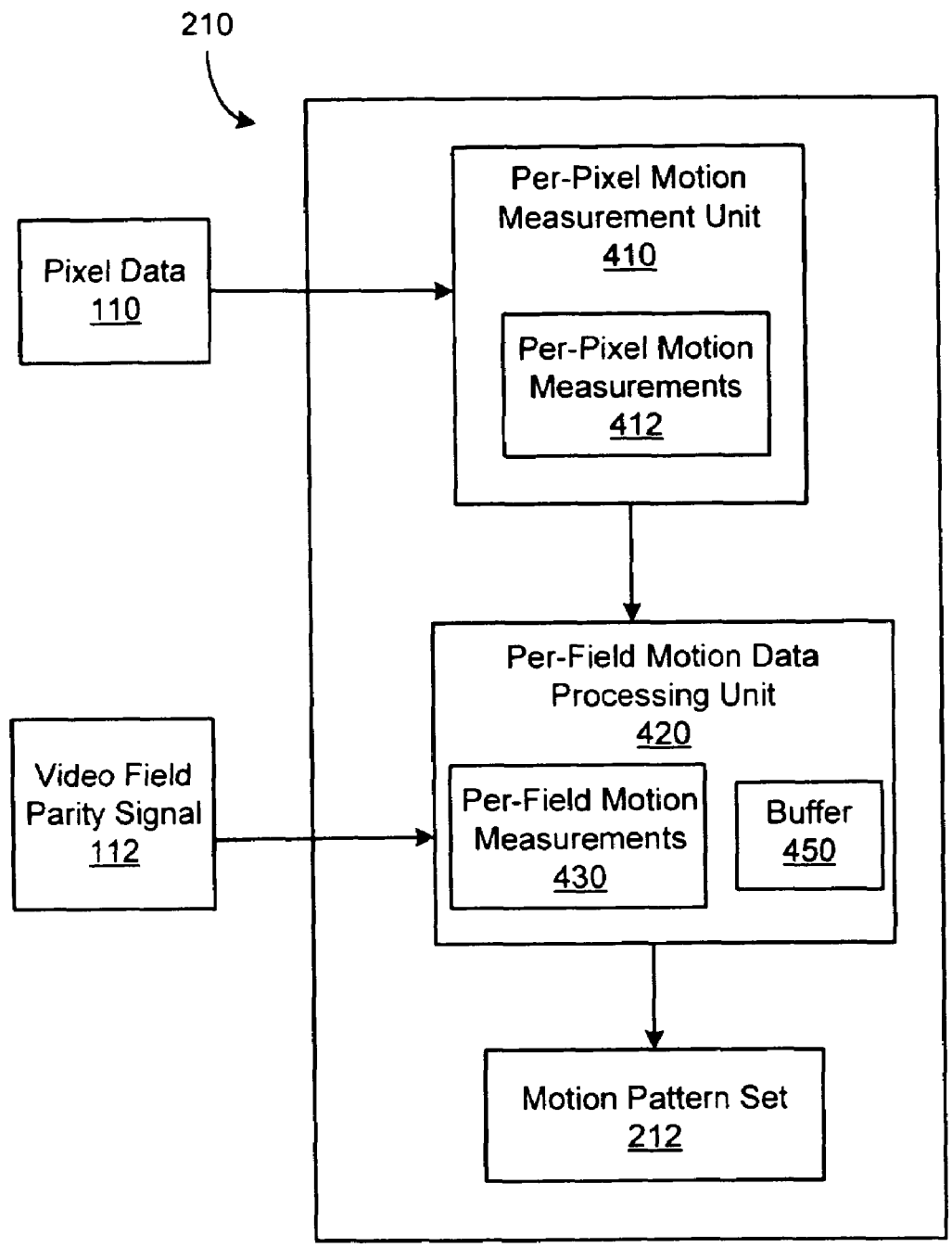
FIG. 4 is a schematic block diagram of one version of the motion detection unit.

FIG. 3 is a flowchart illustrating a process for de-interlacing the input video signal 100 from an interlaced subject field, e.g., 10b, according to one version of the present invention. A schematic block diagram of one version of the motion detection unit 210 is illustrated in FIG. 4. Referring to FIGS. 2, 3, and 4, the process for de-interlacing begins when the de-interlacing system 200 receives the interlaced input video signal 100 (step 300). The interlaced input signal 100 includes pixel data 110 for each pixel 14 (FIG. 1) in a scan line 12a, 12b in fields preceding, e.g., 10a, the subject field 10b, and following, e.g., 10c, the subject field 10b, as well as in the subject field 10b itself. The pixel data 110 can be a monochrome video signal or the luminance components of a component color video signal for the corresponding pixel 14. The input signal 100 is also stored directly in the memory module 300 so that the de-interlacing system 200 can access the pixel data 110 during the de-interlacing process, e.g., by the FRC 240 or the video processing unit 230. Note that although not explicitly shown, the de-interlacing system 200 continuously receives and stores the interlaced input video signal 100 from video fields downstream from the subject field 10b.

The de-interlacing system 200 goes to a first target pixel in the subject field 10b that is to be outputted as the progressive video signal 400 (step 302). According to one version, the motion detection unit 210 analyzes the pixel data 110 and calculates per-field motion measurements 430 related to the subject field 10b (step 304). The per-field motion measurements 430 are temporarily stored in the buffer 450. The motion detection unit 210 then utilizes the motion measurements 430 for the subject field 10b and motion measurements 430 for a plurality of preceding fields 10 to generate the motion pattern 212 associated with the subject field 10b (step 306).

The motion pattern 212 is then analyzed by the PSI unit 220 to determine whether the input signal 100 is derived from a progressive source (step 308). If a progressive source is not detected (step 310), the PSI unit 220 instructs the video processing unit 230 to perform per-pixel interpolation for each target pixel 16 in the subject field 10b (step 311). The progressive video signal 400 is outputted and the de-interlacing system 200 goes to a first target pixel in a next subject field 10b (step 313) and steps 304 through 310 are repeated. On the other hand, if a progressive source is detected (step 310), the PSI unit 220 determines which fields 10a, 10c, or combination of fields should be merged with the subject field 10b to reconstruct correctly the progressive frame 11 (step 312) and instructs the video processing unit 230 to merge the fields 10 (step 314). If necessary, the PSI unit 220 can also instruct the video processing unit 230 to perform progressive frame rate conversion (step 315) based on the progressive source detected. The progressive video signal 400 is outputted and the de-interlacing system 200 goes to a first target pixel in a next subject field 10b (step 316) and steps 304 through 316 are repeated.

Referring again to FIG. 4, the motion detection unit 210 includes a per-pixel motion measurement unit 410 and a per-field motion data processing unit (MDPU) 420. The per-pixel motion measurement unit 410 analyzes the pixel data 110 for pixels 14 in at least one field preceding (10a) and in at least one field following (10c) the subject field 10b, as well as in the subject field 10b itself. From this analysis, the per-pixel motion measurement unit 410 generates per-pixel motion measurements 412 for fields of the same and opposite parity.

Figure 5:
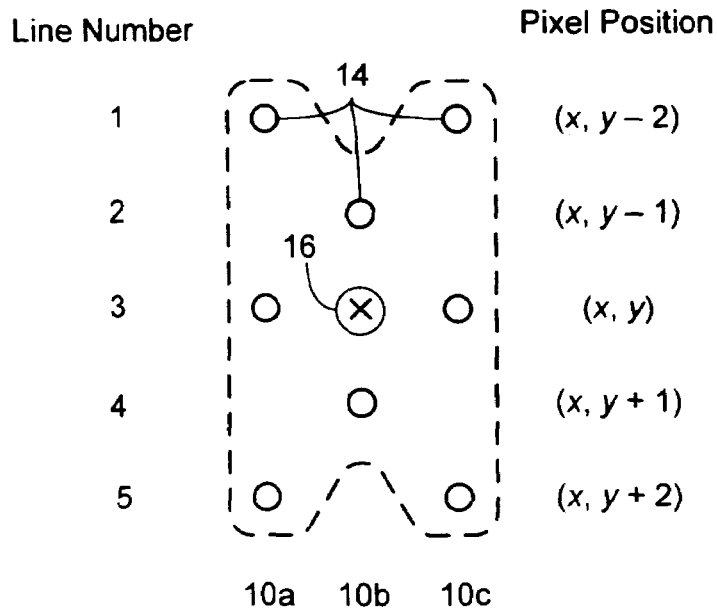
FIG. 5 illustrates a schematic representation of eight pixels used to calculate motion data according to one version.

In one version, same and opposite parity field per-pixel motion measurements 412 are calculated from eight (8) pixels 14 that form a butterfly-like configuration surrounding the missing target pixel 16. FIG. 5 illustrates a schematic representation of the eight pixels 14 according to this version. Three pixels 14 in each of the preceding 10a and subsequent 10c fields and two pixels 14 in the subject field 10b are used to calculate the same and opposite-parity field motion measurements 412. All eight pixels 14 are vertically adjacent in their respective fields and they form a butterfly profile in the temporal-vertical plane.

Figure 6A:
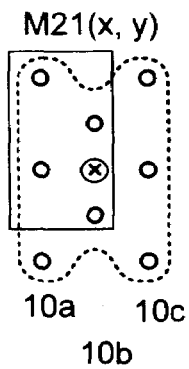
FIGS. 6A through 6E illustrate pixels that are utilized to calculated associated motion measurements.
Figure 6B:
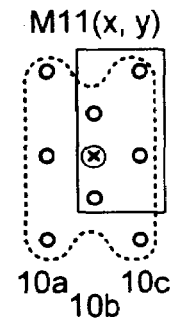
Figure 6E:
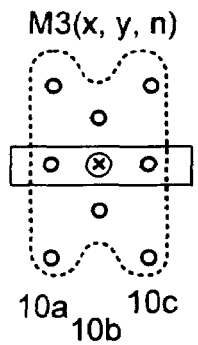
Figure 6C:
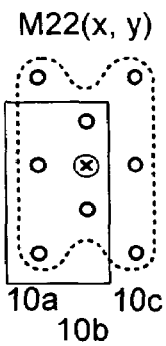
Figure 6D:
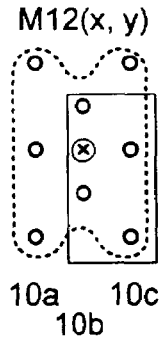

From the eight pixels 14, five (5) motion measurements are calculated. FIGS. 6A through 6E illustrate which pixels 14 are utilized to calculated the associated motion measurements. FIGS. 6A and 6C produce opposite-parity field motion measurements (e.g., M21 and M22) between fields 10a and 10b, while FIGS. 6B and 6D produce opposite-parity field motion measurements (M11, M12) between fields 10b and 10c. FIG. 6E produces same-parity field motion measurements (M3) between fields 10a and 10c.

Various methods and systems for measuring per-pixel motion in same and opposite-parity fields can be utilized to generate the per-pixel motion measurements 412, and these are known to those skilled in the art. Nevertheless, it is preferable to utilize a method and apparatus described in a commonly assigned United States patent application, entitled "Method and System for Detecting Motion Between Video Field of Same and Opposite Parity From An Interlaced Video Source," U.S. application Ser. No. 11/001,826 filed on Dec. 2, 2004, and is herein incorporated by reference in its entirety.

Figure 7:
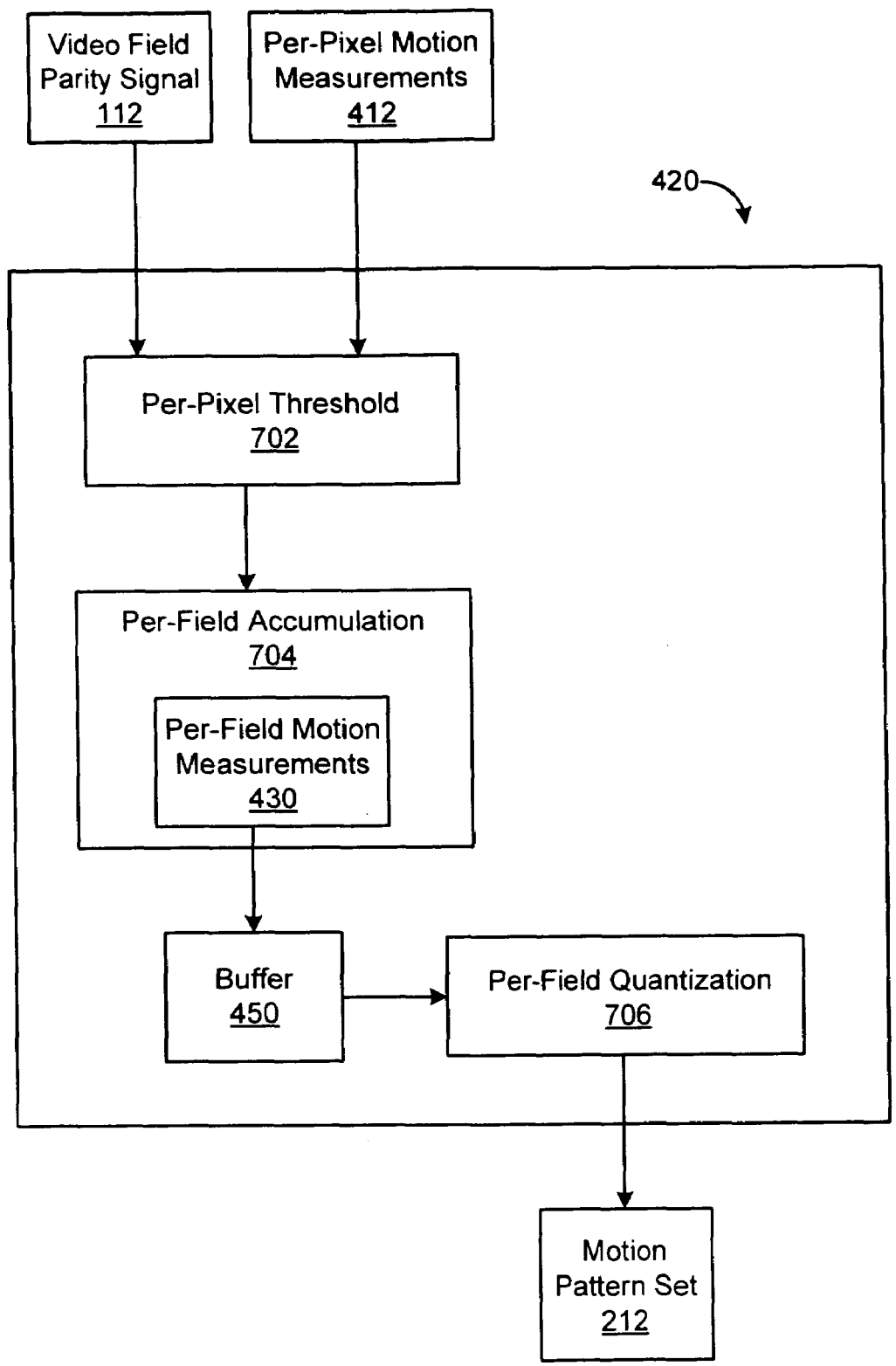
FIG. 7 illustrates a schematic block diagram of the per-field motion data processing unit according to a version of the present invention.

Referring again to FIG. 4, the per-pixel motion measurements 412 are received and utilized by the per-field MDPU 420 to generate per-field motion measurements 430 related to the subject field 10b. FIG. 7 illustrates a schematic block diagram of the per-field MDPU 420 according to a version of the present invention. The per-field MDPU 420 includes a per-pixel threshold unit 702, a per-field accumulation unit 704, and a per-field quantization unit 706. The per-pixel threshold unit 702 determines the extent to which the same and opposite-parity field per-pixel motion measurements 412 exceed predetermined same and opposite-parity field threshold values. Those per-pixel motion measurements 412 that exceed the predetermined threshold values are passed to the per-field accumulation unit 704, which accumulates them and generates per-field motion measurements 430, which represent the level of motion between two fields or between regions of two fields of opposite and same parity.

In one version, the per-pixel threshold unit 702 also receives and analyzes a video field parity signal 112, which indicates the parity value, i.e., even or odd, of the fields 10a, 10b, 10c under consideration. By analyzing the video field parity signal 112, the per-pixel threshold unit 702 can detect abnormal field sequences. For example, a normal field sequence comprises a string of alternating parity fields, i.e., odd-even-odd-even . . . , fields. An abnormal field sequence is one that violates the alternating parity sequence resulting, for example, from a bad edit or some other anomaly. If the per-pixel threshold unit 702 detects such an event from the video field parity signal 112, it will artificially increase the per-pixel motion measurements 412 corresponding to the out-of-sequence field pair, thereby elevating the corresponding per-field motion measurement 430.

FIG. 8A illustrates an exemplary logic diagram of the per-pixel threshold function 702 and per-field accumulation function 704 according to one version. As is shown in FIG. 8A, opposite-parity field per pixel motion measurements 412 ($M_{11}$, $M_{12}$ and $M_{21}$, $M_{22}$) are added and the added value is inputted into threshold functions (e.g., "x" input) 802. It is determined whether the inputs ("x") are greater than a threshold value ("y" input) for opposite-parity field per-pixel motion measures (PER_PIXEL_OPPO_1) 804a. If the input (x) is not greater than the threshold (y), then the output of the threshold function is zero (0). Otherwise, the threshold function output is the difference, i.e., (x–y), between the input (x) and the threshold value (y).

Similarly, the same-parity field per pixel motion measurement ($M_3$) is inputted into another threshold function 802 where it is determined whether the inputted value (x) is greater than a threshold value ("y" input) for same-parity field per-pixel motion measures (PER_PIXEL_SAME_1) 804b. If the inputted value (x) is not greater than the threshold value (y), then the output of the threshold function is zero (0). Otherwise, the threshold function output is the difference, i.e., (x–y), between the inputted value (x) and the threshold value (y).

Each threshold function output is inputted into a multiplexer (MUX) 806 that receives an address signal indicating whether an abnormal field sequence exists. If an abnormal field sequence is detected, the signal will be a zero (0), and the MUX 806 will pass a value corresponding to the signal. The value, e.g., 1023, is an artificially elevated motion measurement to indicate that the field sequence has been interrupted. If an abnormal field sequence is not detected, the signal will be a one (1), and the MUX 806 will pass the threshold function output. The MUX outputs are passed to the per-field accumulation unit 704 which accumulates the thresholded per-pixel motion measurements and outputs per-field motion measurements 430 between opposite field pairs ($MF_{bc}$, $MF_{ab}$) and same field pairs ($MF_{ac}$).

Referring again to FIG. 7, the per-field quantization unit 706 collects the per-field motion measurements 430 for the subject field 10b and for a plurality of preceding fields 10 from the buffer 450. The quantization unit 706 quantizes the per-field motion measurements 430 to reduce the number of bits used to represent their values. The resultant output of the per-field quantization unit 706 is the per-field motion pattern 212 associated with the subject field 10b. In one version, the per-field motion pattern set 212 comprises a pair of motion patterns: one corresponding to a same-parity motion pattern and the other corresponding to an opposite-parity motion pattern. Each bit in each motion pattern corresponds to a per-field motion measurement for a subject field 10b or one of a plurality of its preceding fields 10.

FIG. 8B and FIG. 8C illustrate exemplary logic diagrams of the per-field quantization function 706 according to one version. In FIG. 8B, the per-field quantization unit 706 collects same-parity per-field motion measurements 430*a* for the subject field 10*b* and for a number (N−1), of preceding fields 10, and quantizes each of the N motion measurements 430*a* into L bits according to M same-parity adaptive threshold values 830*a* where $$M=2^L-1.$$

The per-field quantization unit 706 does the same for opposite-parity per-field motion measurements 430*b* with opposite-parity adaptive threshold values 830*b*, as shown in FIG. 8C.

In the version shown in FIG. 8B and FIG. 8C, the motion measurements 430*a*, 430*b* from six fields are quantized utilizing one adaptive threshold value for same-parity 830*a* and opposite-parity 830*b* values, i.e., M=1. Accordingly, each per-field motion measurement 430*a*, 430*b* is quantized into a one bit value, i.e., L=1, and the same-parity 212*a* and opposite-parity 212*b* motion patterns each comprise six (6) bits, one for each field 10 considered.

As its name indicates, the adaptive threshold value 830*a*, 830*b* can vary with the same-parity 430*a* and opposite-parity 430*b* per-field motion measurements, respectively. In a preferred embodiment, the same-parity adaptive threshold value 830*a* is the lesser of: (1) the weighted average of the N same-parity per-field motion measurements 430*a*, and (2) a predetermined maximum value, (PER_FIELD_MAX_FA$_{ac}$), 810*a* for which the same-parity per-field motion measurement 430*a* can be considered as indicating no motion between the same-parity fields. Accordingly, the adaptive threshold value 830*a* can be less than, but will not exceed, the predetermined maximum value (PER_FIELD_MAX_FA$_{ac}$) 810*a* thereby ensuring a more reliable and accurate detection mechanism.

The same applies for the opposite-parity adaptive threshold value 830*b*. That is it is the lesser of: (1) the weighted average of the N opposite-parity per-field motion measurements 430*b*, and (2) a predetermined maximum value, (PER_FIELD_MAX_FA$_{bc}$), 810*b* for which the opposite-parity per-field motion measurement 430*b* can be considered as indicating no motion between the opposite-parity fields.

As is shown in FIG. 8B and FIG. 8C, each same-parity 430*a* and opposite-parity 430*b* per-field motion measurement is compared, via a comparator 820, to the same-parity 830*a* and opposite-parity 830*b* adaptive threshold value, respectively. If a same-parity motion measurement 430*a* is greater than the adaptive threshold value 830*a*, then motion between the two corresponding fields, e.g., 10*a* and 10*c*, is concluded, and it is assumed that they are not from the same progressive frame 11. Similarly, if the motion measurement 430*a* is less than the adaptive threshold value 830*a*, then it is presumed that the two corresponding fields 10*a*, 10*c* have no motion between them, and that they are from the same progressive frame 11.

The per-field motion patterns 212*a*, 212*b* comprise the results of the threshold comparison by the comparators 820 and form a per-field motion pattern pair in the motion pattern set 212 for the subject field 10*b*. In one version, the per-field motion patterns 212*a*, 212*b* are a string of six (6) bits, where each bit represents the relative motion between same-parity or opposite-parity fields for a given one of the six most recent subject fields 10*b*. The number of bits, N, representing the N most recent fields, can be variable, depending on the characteristics of a progressive source being detected. For example, if the original progressive frames are broken into interlaced fields using a 3:2 pull-down technique, e.g., for NTSC or ITU-R BT.709-4 60/I formats, at least three (3) consecutive fields are required to identify the characteristic cadence associated with the 3:2 pull-down technique. Whereas, if a 2:2 pull-down technique is used, e.g., for PAL, SECAM, ITU-R BT.709-4 50/I, or 25PsF formats, at least two (2) consecutive fields are required. In order to distinguish between the characteristic cadences associated with the 3:2 and 2:2 pull-down techniques, at least six (6) consecutive fields are required. For more complicated pull-down techniques, e.g., 4:2:2:2 or 3:3:2:2, the number of bits/consecutive fields, N, can be greater than 6.

In the version shown, because the motion patterns 212*a*, 212*b* represent six (6) consecutive fields, both a 3:2 and a 2:2 pull-down can be detected simultaneously. The per-field motion pattern pair 212*a*, 212*b* will fluctuate on a per-field basis because a set of new per-field motion measurements 430 is introduced for every new subject field 10*b*. Moreover, the adaptive threshold values 830*a*, 803*b* can fluctuate with each new set of motion measurements 430 because the adaptive threshold value 830*a*, 830*b* is based in part on the newest and most recent motion measurements 430. Accordingly, the per-field motion patterns 212*a*, 212*b* are more sensitive to motion fluctuations from field to field, and more accurately represent the nature of the interlaced input signal. Thus, false detections and/or missed detections can be reduced.

Referring again to FIG. 2, the PSI unit 220 utilizes the per-field motion pattern set 212 to determine whether the input signal 100 is derived from one of a plurality of progressive sources. FIG. 9 is a schematic block diagram of a version of the PSI unit 220 according to a version of the present invention. The PSI unit 220 comprises a motion data matching unit 900, progressive mode pattern pairs 902 and masks 904 that are utilized by the matching unit 900, and a progressive mode detector state machine unit ("state machine") 950.

The motion data matching unit 900 compares the motion pattern pair 212*a*, 212*b* in the motion pattern set 212 for the subject field 10*b* to a plurality of predetermined pattern pairs 902 to determine whether the motion pattern pair 212*a*, 212*b* matches any of the progressive mode pattern pairs 902, which are characteristic cadences associated with a progressive frame conversion method. FIG. 10 is a schematic block diagram of the motion data matching unit 900 according to a version of the present invention. The matching unit 900 comprises a plurality of bit pattern matching units 901_1 to 901_*k*, where k is the number of predetermined pattern pairs 902 that can be tested.

For example, FIG. 11A illustrates the plurality of progressive mode pattern pairs 902 that can be characteristic of 3:2 or 2:2 pull-down cycles. Additional cycles representing other pull-down cycles can be tested merely by adding additional pattern pairs 902. Accordingly the number of predetermined pattern pairs 902 is not limited to those listed in FIG. 11A. As is shown, each pattern number 903 is associated with a pattern pair 902 comprising a same-parity pattern 902*a* and an opposite parity pattern 902*b*. Each same-parity pattern 902*a* is different, and each opposite-parity pattern 902*b* is different. Thus, each pair 902 is different.

FIG. 12 illustrates an exemplary logic diagram of a bit pattern matching unit, e.g., 901_1, according to one version of the present invention. The bit pattern matching unit 901_1 compares bit-to-bit the pattern pair associated with the pattern number "1" 903 with the corresponding same-parity 212*a* and opposite-parity 212*b* motion patterns, e.g., via an XOR gate. The result of each comparison is then "AND'ed" with a corresponding bit of a matching parity mask 904*a*, 904b associated with the pattern number "1" 903. Exemplary masks 904 are shown in FIG. 11B. The results are then "NOR'ed" to generate an affirmative (bit value=1) or negative (bit value=0) match value 905_1.

In another version, the per-field motion pattern set 212 comprises, in addition to the same and opposite-parity motion patterns 212a, 212b, a pair of motion enable patterns: one corresponding to a same-parity enable motion pattern 213a and the other corresponding to an opposite-parity enable motion pattern 213b. Each bit in each enable pattern 213a, 213b is associated with a bit in the matched parity motion pattern 212a, 212b, and depending on its value, enables (value=1) or disables (value=0) the associated motion pattern bit. If a motion pattern bit is disabled, it will not be considered when determining whether the input video is derived from a progressive source. This is advantageous when the motion measurements between fields are unusual, for example, when the filmed content is stationary, i.e., a still image, and the motion measurements between same and opposite-parity fields is very small. In that situation, a missed detection, i.e., a failure to detect a progressive source, is likely.

FIG. 8D and FIG. 8E illustrate exemplary logic diagrams of the per-field quantization function 706 that generates the motion enable patterns and motion patterns 212a, 212b. As is shown in FIG. 8D, each same-parity per-field motion measurement 430a is compared, via a comparator logic 822, to the adaptive threshold value 830a the result of which is reflected in the bits of the motion pattern 212a. In addition, each same-parity per-field motion measurement 430a is compared to a predetermined minimum value (PER_FIELD_MIN_FE$_{ac}$) 812a for which the same-parity per-field motion measurement 430a can be considered as reliably indicating no motion between the same-parity fields.

FIG. 8F is an exemplary logic diagram of the comparator logic 822 according to a version of the present invention. If the same-parity motion measurement 430a and/or the same-parity adaptive threshold value 830a is greater than the predetermined value (PER_FIELD_MIN_FE$_{ac}$) 812a, then the corresponding same-parity motion enable bit (output "b") will have a value=1, and the corresponding motion pattern bit (output "a") will be "enabled," i.e., considered for progressive source identification. Only if both the motion measurement 430a and the same-parity adaptive threshold value 830a are less than the predetermined value (PER_FIELD_MIN_FE$_{ac}$) 812a, the corresponding same-parity motion enable bit will have a value=0, and the corresponding motion pattern bit will be "disabled," i.e., not considered for progressive source identification. The per-field quantization unit 706 illustrated in FIG. 8E generates the opposite-parity motion enable pattern 213b in the same manner using a predetermined minimum value (PER_FIELD_MIN_FE$_{bc}$) 812b for which the opposite-parity per-field motion measurement 430b can be considered as reliably indicating no motion between the opposite-parity fields.

The per-field motion pattern set 212 comprising the same and opposite-parity motion patterns 212a, 212b and the same and opposite-parity motion enable patterns 213a, 213b are then used by the motion data matching unit 900. FIG. 13 illustrates an exemplary logic diagram of a bit pattern matching unit, e.g., 901_1, according to this version of the present invention. The bit pattern matching unit 901_1 compares bit-to-bit the pattern pair associated with the pattern number "1" 903 with the corresponding same-parity 212a and opposite-parity 212b motion patterns, e.g., via an XOR gate. The result of each comparison is then "AND'ed" with a corresponding bit of a matching parity mask 904a, 904b associated with the pattern number "1" 903 and a corresponding bit of the same-parity 213a and opposite-parity 213b motion enable patterns. The results are then "NOR'ed" generate an affirmative (bit value=1) or negative (bit value=0) match value 905_1.

Referring again to FIG. 10, each bit pattern matching unit, e.g., 901_k, tests the motion pattern pair 212a, 212b against the unit's corresponding progressive mode pattern pair 902 and generates an affirmative or negative match value 905_k. In this version, a match is determined only if both the unmasked, and in one version, enabled, bits of the same-parity motion pattern 212a match the same-parity progressive mode pattern 902a, and the unmasked, and in one version, enabled, bits of the opposite-parity motion pattern 212b match the opposite-parity progressive mode pattern 902b.

If each progressive mode pattern pair 902 is different, as illustrated in FIGS. 11A and 11B, at most, only one bit pattern matching unit 901_1 to 901_k can issue an affirmative match value 905_1 to 905_k for a given motion pattern pair 212a, 212b in the version where the motion enable patterns 213a, 213b are not used. If, however, the motion enable patterns 213a, 213b are used and non-matching motion pattern bits are disabled, it is possible to have more than one affirmative match value 905_1 to 905_k. This case is discussed in more detail below.

By requiring both same-parity and opposite-parity field matching, the affirmative match decision (bit value=1) is more accurate and reliable. The likelihood of a false detection is reduced, and therefore, a decision to enter a progressive source mode based on the match results can be more accurate. By masking non-matching bits and disabling unreliable bits of same-parity 212a and opposite-parity 212b motion patterns, the negative match decision (bit value=0) is more accurate and reliable. The likelihood of a missed detection is reduced, and therefore, a decision to exit a progressive source mode based on the match results can be more accurate.

The match values 905_1 to 905_k (collectively 905) are inputted into a bit pattern match encoding logic 906 to generate a match indication value 910 and a match pattern number 920 for the subject field 10b. Table A below tabulates the match values 905_1 to 905_k, where k=7, and the associated match pattern numbers 920 and associated match indication values 910 for the progressive mode patterns 902 in FIG. 11A.

TABLE A

| Match Value (905) | | | | | | | Match Pattern | | | Match Indication |
|---|---|---|---|---|---|---|---|---|---|---|
| 7 | 6 | 5 | 4 | 3 | 2 | 1 | Number (920) | | | Value (910) |
| 0 | 0 | 0 | 0 | 0 | 0 | 1 | 0 | 0 | 0 | 1 (Match) |
| 0 | 0 | 0 | 0 | 0 | 1 | 0 | 0 | 0 | 1 | 1 (Match) |
| 0 | 0 | 0 | 0 | 1 | 0 | 0 | 0 | 1 | 0 | 1 (Match) |
| 0 | 0 | 0 | 1 | 0 | 0 | 0 | 0 | 1 | 1 | 1 (Match) |
| 0 | 0 | 1 | 0 | 0 | 0 | 0 | 1 | 0 | 0 | 1 (Match) |
| 0 | 1 | 0 | 0 | 0 | 0 | 0 | 1 | 0 | 1 | 1 (Match) |
| 1 | 0 | 0 | 0 | 0 | 0 | 0 | 1 | 1 | 0 | 1 (Match) |
| 0 | 0 | 0 | 0 | 0 | 0 | 0 | 1 | 1 | 1 | 0 (No Match) |
| All Other Bit Combinations | | | | | | | x | x | x | 2 (Hold) |

All but one match pattern number 920 uniquely identifies a progressive mode pattern pair 902 associated with a pattern number 903. One match pattern number, e.g., "111", indicates that no matches were identified, i.e., match indication value of zero (0).

As stated above, if non-matching motion pattern bits are disabled by associated motion enable pattern bits, it is possible to have more than one affirmative match value 905_1 to 905_$k$ (bit value=1). In this situation, the match indication value 910 will be two (2), representing an abnormal motion condition.

Referring again to FIG. 9, the match indication value 910 and match pattern number 920 for the subject field 10$b$ are passed to the state machine 950, which determines whether the de-interlacing system 200 enters into or exits out of a progressive source mode. In the progressive source mode, the de-interlacing system 200 recognizes that the input signal 100 is from a progressive source and converts the input signal 100 into the progressive signal 400 by merging fields 10 to reconstruct the progressive frames 11 from which the fields 10 are derived. In such a mode, the state machine 950 determines which field(s) to merge with the subject field 10$b$ to correctly reconstruct the progressive frame 11.

The state machine 950 utilizes a match count threshold 952 to decide when to switch into the progressive source mode from an interlaced source mode, and a mismatch count threshold 954 to decide when to switch out of the progressive source mode and into the interlaced source mode. The match count threshold 952 is an integer representing the minimum number of correct consecutive matches necessary to trigger the progressive source mode. A correct match satisfies two criteria: (1) the match indication value 910 for the subject field 10$b$ affirmatively indicates a match, i.e., value=1, and (2) the match pattern number 920 for the subject field 10$b$ corresponds to a pattern number 903 that is a next pattern number 960 for the preceding field 10$a$, assuming the preceding field 10$a$ has an affirmative match indication value 910.

FIG. 14 illustrates next pattern numbers 960 for the pattern numbers 903 shown in FIG. 11A. As is shown, for a 3:2 pull-down cycle, the proper pattern number sequence is 1-2-3-4-5-1 . . . If the pattern number sequence is disrupted, e.g., 1-2-3-5-1, the input signal may not be from a 3:2 pull-down progressive source. Accordingly, if a preceding field 10$a$ has a match pattern number 920 corresponding to pattern number "5" 903, the next pattern number 960 is "1." The subject field 10$b$ must gave a match pattern number 920 corresponding to pattern number "1" in order to be counted as a correct match.

Referring again to FIG. 9, the state machine 950 keeps track of the number of correct consecutive matches when the de-interlacing system is operating in the interlaced source mode. When an incorrect match is detected, e.g., the match indication value 910 is zero (0), or the match pattern number 920 fails to match the next pattern 960 of the preceding field, the state machine 950 resets the count to zero (0). If the number of correct consecutive matches exceeds the match count threshold 952, the state machine 950 switches from the interlaced source mode into the progressive source mode by setting a progressive mode indicator "on," i.e., value=1. In one embodiment, the match count threshold 952 is between about 8 and 15, and preferably about 10. If greater accuracy is desired, the match count threshold 952 can be higher, and vice versa. Accordingly, if the match count threshold 952 is about 10, the state machine 950 requires at least about 16 to 18 fields to switch into the progressive source mode. During this interim period, the 16 to 18 fields are converted using per-pixel de-interlacing techniques.

While in the progressive source mode, the state machine 950 determines which field(s) to merge with the subject field 10$b$ to reconstruct the progressive frame 11. Typically, for 3:2 or 2:2 pull-down techniques, the following de-interlacing commands 970 and their corresponding command codes 982 are shown in Table B below.

TABLE B

| De-interlacing Command Code (982) | De-Interlacing Command (970) |
|---|---|
| 0 | Merge with $(F_{n-1} + F_{n+1})/2$ |
| 1 | Merge with $F_{n+1}$ |
| 2 | Merge with $F_{n-1}$ |
| 3 | Perform Per-Pixel Interpolation |

Other types of de-interlacing commands 970 can be appropriate for pull-down cycles other than 3:2 or 2:2.

The state machine 950 determines the correct de-interlacing command 970 based on the match pattern number 920 of the subject field 10$b$. As stated above, only one match pattern number, e.g., "111", corresponds to a "no match" condition. In this situation, the correct de-interlacing command 970 is command code "3", per-pixel interpolation. All the other match pattern numbers 920 correspond to pattern numbers 903 and associated progressive mode pattern pairs 902. Because the progressive mode pattern pair 902 is known for a particular match pattern number 920, the correct de-interlacing command 970 is easily determined. Table C, below, correlates the match pattern number 920 with the de-interlacing command code 982.

TABLE C

| Cycle Type | Match Pattern Number (920) | De-Interlacing Command Code (982) |
|---|---|---|
| 3:2 Cycle | 000 | 0 |
| | 001 | 2 |
| | 010 | 1 |
| | 011 | 2 |
| | 100 | 1 |
| 2:2 Cycle | 101 | 2 |
| | 110 | 1 |
| No Match | 111 | 3 |

Referring again to FIG. 9, while the state machine 950 is in the progressive source mode, it outputs an affirmative progressive mode indicator 980 and the command code 982 associated with the proper de-interlacing command 970. Notably, the fields that have a match indication value 910 of zero (0) will also have a match pattern number 920 of "111." Because the per-pixel interpolation command, i.e., command code three (3), is associated with match pattern number 111 (see Tables B and C above), these fields will be converted using per-pixel de-interlacing methods, as opposed to field merging techniques.

If an incorrect match is detected during the progressive source mode, e.g., the match indication value 910 for the subject field 10$b$ is zero (0), or the match pattern number 920 fails to match the next pattern 960 of the preceding field, the state machine 950 will begin counting mismatches. The mismatch count threshold 954 is an integer representing the minimum number of consecutive mismatches necessary to exit the progressive source mode. If the number of consecutive mismatches exceeds the mismatch count threshold 954, the state machine 950 switches out of the progressive source mode by turning the progressive mode indicator 980 "off," i.e., value=0.

In one embodiment, the mismatch count threshold 954 is between about 3 and about 8, and preferably 5. If greater accuracy is desired, the mismatch count threshold 954 can be smaller, and vice versa. Accordingly if the mismatch count threshold 954 is about 5, the state machine 950 requires at least about 11 to 13 fields to switch out of the progressive source mode.

If the match indication value 910 for the subject field 10*b* is two (2), for example because more than one affirmative match value 905_1 to 905_*k* has been generated, the state machine 950 will hold its current state, regardless of whether it is in the progressive source mode or the interlaced source mode. In this situation, if the state machine 950 is in the progressive source mode, it can hold its state by using the next pattern number 960 for the previous pattern number 903 as the match pattern number 920 for the subject field 10*b*. The state machine 950 then can issue the same progressive mode indicator 980 and the de-interlacing command code 982 associated with the match pattern number 920. In this manner, is unusually low per-field motion measurements are detected, e.g., because the film content is a still image, the state machine 950 sill not necessarily exit from the progressive source mode due to a series of missed detections.

As is shown in FIG. 9, the progressive mode indicator 980 and the de-interlacing command code 982 are passed to the video processing unit 230, where field merging or per-pixel interpolation is performed and the progressive video signal 400 is outputted. FIG. 15 is a schematic block diagram of the video processing unit (VPU) 230 according to a version of the present invention. The VPU includes a field merging unit 500, and a per-pixel de-interlacing unit 600.

In one version, the field merging unit 500 receives the pixel data 110 directly or retrieves the pixel data 110 from the memory 300 and receives the command code 982 from the state machine 950 in the PSI unit 220. As stated above, the de-interlacing command code 982 corresponds to a de-interlacing command 970. The field merging unit 500 performs the de-interlacing command 970 and merges the appropriate field(s) with the subject field 10*b* or selects a per-pixel de-interlacing output from the per-pixel de-interlacing unit 600 to generate a value for each of the missing target pixels 16 in the subject field 10*b*. The result is one of two inputs to a multiplexer 700, e.g., input "1".

The per-pixel de-interlacing unit 600 also receives the pixel data 110 as well as per-pixel motion measurements 412 from the motion detection unit 210. The per-pixel de-interlacing unit 600 utilizes one or more of the per-pixel de-interlacing methods 235 to generate a value for each of the missing target pixels 16 in the subject field 10*b*. The result is the other of two inputs to the multiplexer 700, e.g., input "0".

The output of the multiplexer 700 is determined by the progressive mode indicator 980 for the subject field 10*b*, which is input signal, S. If the progressive mode indicator 908 has a bit value equal to one (1), i.e., the de-interlacing system 200 is operating in the progressive mode, then the result from the field merging unit 500 is outputted as the progressive video signal 400. Otherwise, if the progressive mode indicator 908 has a bit value equal to zero (0), then the result from the per-pixel de-interlacing unit 600 is outputted.

In one version, the state machine 950, after identifying a progressive source and its conversion type, e.g., 3:2, 2:2, etc., can also output a frame rate conversion command code 984 to the frame rate conversion unit 240 in the video processing unit 230 so that the progressive video signal 400 can be scanned at a frame rate that is an integral multiple of the known frame rate of the detected progressive video source. By scanning the de-interlaced frames at a such frame rate, each de-interlaced frame has an even display time, thereby substantially reducing motion judder artifacts and significantly improving the quality of the output video signal 400.

TABLE D summarizes the standard progressive and interlaced source frame rates, and the standard display frame rates used in world-wide standards.

TABLE D

| | Source Frame Rate (fps) | Standard Display Frame Rate (fps) | | Up-Converted Display Frame Rate (fps) | | | | | |
|---|---|---|---|---|---|---|---|---|---|
| | | 50 | 60 | 72 | 75 | 90 | 96 | 100 | 120 |
| Progressive Source | 24 | X | X | ○ | X | X | ○ | X | ○ |
| | 25 | ○ | X | X | ○ | X | X | ○ | X |
| | 30 | X | ○ | X | X | ○ | X | X | ○ |
| Interlaced Source | 50 | ○ | X | X | X | X | X | ○ | X |
| | 60 | X | ○ | X | X | X | X | X | ○ |

○: even frame time
X: uneven frame time

When the display frame rate is an integral multiple of the source frame rate, each frame from a progressive source or each field from a interlaced source can have an even display time (marked with "O") after de-interlacing. For example, FIG. 16 and FIG. 17 are idealized timing diagrams describing the operation of de-interlacing and frame rate conversion of a 3:2 and a 2:2 pull-down progressive source, respectively, according to one version of the present invention.

FIG. 16 shows that each frame of a film source with a frame rate of 24 fps is converted into three or two interlaced fields using a 3:2 pull-down technique. When displayed at a standard frame rate of 60 fps, the frames are displayed for uneven display frame times. For example, frame "A" is displayed three (3) times, while frame "B" is displayed two times (2). The uneven frame display time creates motion judder that is noticeable by a viewer. By up-converting the display frame rate to 72 fps (three times the film source frame rate) or 96 fps (four times the film source frame rate) and repeating certain frames, the film source will have an even display frame time for each film frame after de-interlacing. Similarly, FIG. 17 shows that each frame of a film source with a source frame rate of 25 fps can be displayed at a standard frame rate of 50 fps, which can be up-converted to a frame rate of 75 fps (three times the film source frame rate) or 100 fps (four times the film source frame rate) with even display frame times for each film frame. Although in this situation, the display frame time for each film frame is even at the standard 50 fps display frame rate, it is desirable to use a higher display frame rate such as 75 fps or 100 fps to overcome flickering caused by a lower frame rate.

Referring again to FIG. 9, the state machine 950 enables on-the-fly frame rate up-conversion when a progressive source is detected. Based on the detected progressive source and on the overall parameters of the display system, the state machine 950 determines the appropriate display frame rate and in turn, the number of times an interlaced frame should be displayed to achieve an even frame display time at the display rate. To implement the frame rate conversion function, the buffer 450 in the motion data processing unit 420 can be enlarged to accommodate the larger frame delay.

The state machine 905 outputs a frame rate conversion command code 984 to the video processing unit 230, in addition to the progressive mode indicator 980 and the de-interlacing command code 982. The frame rate conversion command code 984 consists of two parts: a frame display command code 984a, which is an integer that specifies the number of times the de-interlaced subject field 10b will be displayed, and a frame rate command code 984b, which specifies the display frame rate of the progressive video signal 400. For 3:2 and 2:2 pull-down techniques, the following display frame rates and their corresponding frame rate command codes 984b are shown in TABLE E below.

TABLE E

| Display Frame Rate (fps) | Frame Rate Command Code (984b) |
|---|---|
| 50/60 | 1 |
| 72 | 2 |
| 75 | 3 |
| 90 | 4 |
| 96 | 5 |
| 100 | 6 |
| 120 | 7 |

TABLE F tabulates the frame display command code 984a and the frame rate command code 984b according to the match pattern number 920 for the subject field 10b.

TABLE E

| Display Frame Rate Match Pattern Number (920) | 60 fps/50 fps | | 72 fps/75 fps | | 96 fps/100 fps | |
|---|---|---|---|---|---|---|
| | Frame Display Cmd Code (984a) | Frame Rate Cmd Code (984b) | Frame Display Comd Code (984a) | Frame Rate Comd Code (984b) | Frame Display Comd Code (984a) | Frame Rate Comd Code (984b) |
| 000 | 1 | 1 | 1 | 2 | 1 | 5 |
| 001 | 1 | 1 | 1 | 2 | 2 | 5 |
| 010 | 1 | 1 | 1 | 2 | 1 | 5 |
| 011 | 1 | 1 | 2 | 2 | 3 | 5 |
| 100 | 1 | 1 | 1 | 2 | 1 | 5 |
| 101 | 1 | 1 | 2 | 3 | 3 | 6 |
| 110 | 1 | 1 | 1 | 3 | 1 | 6 |

Thus, for example, if the match pattern number 920 is "001," and the state machine 950 is in a progressive source mode, it will issue a progressive mode indicator 980 having a value of "1," a de-interlacing command code 982 having a value of "2," and a frame rate conversion command code 984 comprising a frame display command code 984a of either 1 or 2, and a frame rate command code 984b of either 1, 2 or 5 depending on the frame display command code 984a.

Referring again to FIG. 15, the frame rate conversion unit 240 receives the frame rate conversion command code 984 and converts the display frame rate to the desired value and causes the video processing unit 230 to display the de-interlaced frame the appropriate number of times according to the frame rate conversion command code 984. Because the frames have even frame display times, the progressive video signal 400 will exhibit significantly reduced motion judder further improving the visual quality of the progressive video signal 400.

According to versions of the present invention, the de-interlacing system 200 is able to identify quickly and accurately a progressive source and its conversion type, e.g., 3:2 or 2:2 or other pull-down conversions. The PSI unit 220 is able to detect simultaneously any number of conversion types, and is not limited to 3:2 or 2:2 pull-down conversion types. The PSI unit 220 can switch between the progressive source mode and the interlaced source mode quickly. The reliability, sensitivity, and response time of the PSI unit 220 are controlled by the values of the match count threshold 952 and the mismatch count threshold 945, and the "observation window width" of the PSI unit 220, which is controlled by the number of bits, N, of the same-parity 212a and opposite-parity 212b motion patterns and the number of masked bits in progressive mode masks 904. For instance, the PSI unit 220 can determine whether to enter a progressive source mode from an interlaced source mode in the span of approximately 16 to 18 fields, i.e., less than 0.3 seconds, and to switch from the progressive source mode to the interlaced source mode in a span of approximately 11 to 13 fields, i.e., approximately 0.2 seconds. Accordingly, the visual quality of the output signal is significantly improved, while undesirable visual artifacts, such as feathering and sawtooth, resulting from improper field merging is substantially reduced.

Moreover, because the per-field motion pattern pair 212 is generated utilizing adaptive thresholds, as opposed to fixed thresholds, the motion pattern pair 212 more accurately reflects the same-parity and opposite-parity field motion associated with the subject field 10b, which leads to more reliable and accurate progressive source identification. Pattern matching is based on both opposite-parity and same-parity patterns to ensure a valid match, thereby significantly increasing the reliability of the match and reducing the likelihood of a false detection.

The present invention has been described with reference to certain preferred versions. Nevertheless, other versions are possible. For example, the number of pixels and the locations of the pixels used to calculate motion measurements related to the missing target pixel can vary and other types of per-pixel interpolation methods can be utilized. In addition, more or fewer per-field threshold levels can be utilized. Further, alternative steps equivalent to those described for the de-interlacing process can also be used in accordance with the parameters of the described implementation, as would be apparent to one of ordinary skill. Therefore, the spirit and scope of the appended claims should not be limited to the description of the preferred versions contained herein.

What is claimed is:

1. A method of de-interlacing an interlaced video signal comprising a plurality of even-parity and odd-parity video fields, the method comprising:

(a) generating a per-field motion pattern set for a subject video field, the per-field motion pattern set comprising a same-parity and an opposite-parity motion pattern pair;

(b) providing a plurality of progressive mode pattern pairs, each comprising a same-parity and an opposite-parity progressive mode pattern, wherein each progressive mode pattern pair is unique and characteristic of one of a plurality of progressive frame-to-interlaced field conversion techniques;

(c) comparing the same-parity and opposite-parity motion pattern pair for the subject video field with each progressive mode pattern pair to determine whether the subject video field is derived from a progressive source and to identify the progressive frame-to-interlaced field conversion technique used; and (d) based on the comparison, utilizing a field-merging de-interlacing technique or a per-pixel de-interlacing technique to de-interlace the subject field to produce a progressive video signal.

2. A method according to claim 1 wherein (a) comprises:
(i) utilizing a same-parity adaptive threshold value to quantize same-parity per-field motion measurements to generate the same-parity motion pattern, wherein the same-parity adaptive threshold value is based on same-parity per-field motion measurements for the subject field and for fields preceding the subject field; and
(ii) utilizing an opposite-parity adaptive threshold value to quantize opposite-parity per-field motion measurements to generate the opposite-parity motion pattern, wherein the opposite-parity adaptive threshold value is based on opposite-parity per-field motion measurements for the subject field and for fields preceding the subject field.

3. A method according to claim 2 wherein (a) further comprises:
(iii) prior to (i), analyzing pixel data associated with a plurality of pixels temporally and spatially proximate to a missing target pixel in the subject video field, wherein the proximate pixels include at least one pixel in the subject video field, at least one pixel in a video field temporally preceding the subject video field and at least one pixel in a video field temporally subsequent to the subject field;
(iv) calculating same-parity and opposite-parity per-pixel motion measurements between the plurality of pixels;
(iii) calculating the same-parity per-field motion measurement for the subject field based on the same-parity per-pixel motion measurements; and
(v) calculating the opposite-parity per-field motion measurement for the subject field based on the opposite-parity per-pixel motion measurements.

4. A method according to claim 3 further comprising:
(e) prior to (a), storing the same-parity and opposite-parity per-field motion measurements for the subject field in a buffer along with the same-parity and opposite-parity per-field motion measurements for the video fields preceding the subject field.

5. A method according to claim 4 wherein (a) further comprises:
(vi) prior to (i), retrieving from the buffer the per-field motion measurements for the subject field and the per-field motion measurements for a predetermined number of preceding fields;
(vii) calculating the same-parity adaptive threshold value based on a weighted average of the same-parity per-field motion measurements for the subject field and for the predetermined number of preceding fields;
(viii) calculating the opposite-parity adaptive threshold value based on a weighted average of the opposite-parity per-field motion measurements for the subject field and for the predetermined number of preceding fields;
(ix) utilizing the same-parity adaptive threshold value to quantize the same-parity per-field motion measurements for the subject field and for the predetermined number of preceding fields to form the same-parity motion pattern for the subject video field; and
(x) utilizing the opposite-parity adaptive threshold value to quantize the opposite-parity per-field motion measurements for the subject field and for the predetermined number of preceding fields to form the opposite-parity motion pattern for the subject video field.

6. A method according to claim 5 wherein the same-parity adaptive threshold value is a lesser of the weighted average of the same-parity per-field motion measurements and a predetermined maximum same-parity motion value, and the opposite-parity adaptive threshold value is a lesser of the weighted average of the opposite-parity per-field motion measurements and a predetermined maximum opposite-parity motion value.

7. A method according to claim 5 wherein the plurality of progressive frame-to-interlaced field conversion techniques includes a 3:2 pull-down and 2:2 pull-down, and the predetermined number of preceding fields is five (5).

8. A method according to claim 2 wherein the per-field motion pattern set for the subject video field further comprises a same-parity motion enable pattern and an opposite-parity motion enable pattern pair, wherein the same-parity and opposite-parity motion enable pattern pair comprises a plurality of motion enable bits associated with a plurality of motion bits of the same-parity and opposite-parity motion pattern pair.

9. A method according to claim 8 further comprising:
(e) prior to step (c), enabling a motion bit of the same-parity or opposite-parity motion pattern if a same-parity or opposite-parity motion measurement associated with the motion bit is reliable; and
(f) disabling the motion bit if the associated motion measurement is unreliable.

10. A method according to claim 9 wherein (e) comprises:
(i) comparing the same-parity or opposite-parity motion measurement and the matching parity adaptive threshold value to a predetermined minimum value for which the motion measurement can be considered as reliably indicating no motion between matching parity fields; and
(ii) setting a value of the associated motion enable bit to one (1) if either of the motion measurement or the adaptive threshold value is greater than the predetermined minimum value,
wherein the enabled motion bit is used to determine whether the subject video field is derived from a progressive source.

11. A method according to claim 10 wherein (f) comprises:
(i) setting the value of the associated motion enable bit to zero (0) if both the motion measurement and the adaptive threshold value are less than the predetermined minimum value,
wherein the disabled motion bit is not used to determine whether the subject video field is derived from a progressive source.

12. A method according to claim 1 wherein (b) comprises:
(i) associating each progressive mode pattern pair with a next progressive mode pattern pair such that each progressive mode pattern pair forms a closed loop with at least one other progressive mode pattern pair.

13. A method according to claim 12 wherein (d) comprises:
(i) determining whether the motion pattern pair for the subject field produces a correct match by:
  (1) determining whether the motion pattern pair for the subject field matches a progressive mode pattern pair; and
  (2) determining whether the matching progressive mode pattern pair is the next progressive pattern pair associated with the progressive mode pattern pair for a field directly preceding the subject field.

14. A method according to claim 13 wherein (d) further comprises:
  (ii) entering a progressive source mode from an interlaced source mode if a number of consecutive correct matches exceeds a predetermined match count;
  (iii) merging the subject field with the field directly preceding the subject field, the field directly following the subject field, or with a combination of the preceding and following fields; and
  (iv) continuing in the progressive source mode for a next subject field.

15. A method according to claim 14 wherein (d) further comprises:
  (v) entering the interlaced source mode from the progressive source mode if a number of consecutive mismatches exceeds a predetermined mismatch count;
  (vi) utilizing a per-pixel interpolation de-interlacing method to generate a value for each missing pixel in the subject field; and
  (vii) continuing in the interlaced source mode for the next subject field until a number of consecutive correct matches exceeds the predetermined match count.

16. A method according to claim 15 wherein the match count is between about 8 and about 15, and the mismatch count is between about 3 and about 8.

17. A method according to claim 1 further comprising:
  (e) controlling a display frame rate of the progressive video source and a number of times the de-interlaced frame is displayed based on the identified progressive frame-to-interlaced field conversion technique used, wherein the display frame rate is an integral multiple of the frame rate of the progressive source such that motion judder is substantially reduced.

18. A method according to claim 17 wherein (e) comprises:
  (i) generating a frame rate conversion command comprising a frame display command code that specifies the number of times the de-interlaced frame is displayed, and a frame rate command code that specifies the display frame rate.

19. A de-interlacing system for de-interlacing an interlaced video signal comprising a plurality of even-parity and odd-parity video fields, the system comprising:
  (a) a motion detection unit for generating a per-field motion pattern set for a subject video field, the motion pattern set comprising a same-parity motion pattern and an opposite-parity motion pattern pair;
  (b) a progressive source identification unit comprising:
    (i) a plurality of progressive mode pattern pairs, each comprising a same-parity and an opposite-parity progressive mode pattern, wherein each progressive mode pattern pair is unique and characteristic of one of a plurality of progressive frame-to-interlaced field conversion techniques;
    (ii) a motion data matching unit for comparing the same-parity and opposite-parity motion pattern pair for the subject video field with each progressive mode pattern pair to determine whether the subject video field is derived from a progressive source and to identify the progressive frame-to-interlaced field conversion technique used; and
    (iii) a state machine for generating a command based on the comparison, the command to utilize a field-merging de-interlacing technique or a per-pixel de-interlacing technique to de-interlace the subject field to produce a progressive video signal; and
  (c) a video processing unit for receiving and executing the command, and for outputting the progressive video signal.

20. A system according to claim 19 wherein the motion detection unit comprises a per-field quantization unit that utilizes a same-parity adaptive threshold value and an opposite-parity adaptive threshold value to quantize same-parity per-field motion measurements and opposite-parity field motion measurements, respectively, to generate the same-parity motion pattern and the opposite-parity motion pattern, respectively, wherein the same-parity and opposite-parity adaptive threshold values are based on same-parity and opposite-parity per-field motion measurements, respectively, for the subject field and for fields preceding the subject field.

21. A system according to claim 20 wherein the same-parity adaptive threshold value is based on a weighted average of the same-parity per-field motion measurements for the subject field and for a predetermined number of preceding fields and wherein the opposite-parity adaptive threshold value is based on a weighted average of the opposite-parity per-field motion measurements for the subject field and for the predetermined number of preceding fields.

22. A system according to claim 20 wherein the same-parity adaptive threshold value is a lesser of the weighted average of the same-parity per-field motion measurements and a predetermined maximum same-parity motion value, and the opposite-parity adaptive threshold value is a lesser of the weighted average of the opposite-parity-per-field motion measurements and a predetermined maximum opposite-parity motion value.

23. A system according to claim 20 wherein the per-field quantization unit further utilizes a same-parity minimum value and an opposite-parity minimum value for which a same-parity and opposite-parity motion measurement, respectively, can be considered as reliably indicating no motion between same-parity fields and opposite-parity fields, respectively, to disable a same-parity or opposite-parity motion measurement.

24. A system according to claim 19 wherein each progressive mode pattern pair is associated with a next progressive mode pattern pair such that each progressive mode pattern pair forms a closed loop with at least one other progressive mode pattern pair.

25. A system according to claim 24 wherein the state machine determines whether the same-parity and opposite-parity motion pattern pair for the subject field produces a correct match, wherein a correct match is produced if the motion pattern pair for the subject field matches a progressive mode pattern pair, and the matching progressive mode pattern pair is the next progressive pattern pair associated with the progressive mode pattern pair for a field directly preceding the subject field.

26. A system according to claim 25 wherein the state machine enters a progressive source mode from an interlaced source mode if a number of consecutive correct matches exceeds a predetermined match count, and transmits a command to merge the subject field with the field directly preceding the subject field, the field directly following the subject field, or with a combination of the preceding and following fields.

27. A system according to claim 26 wherein the state machine enters the interlaced source mode from the progressive source mode if a number of consecutive mismatches exceeds a predetermined mismatch count, and transmits a command to utilize a per-pixel interpolation de-interlacing method to generate a value for each missing pixel in the subject field.

28. A system according to claim 26 wherein the state machine generates a frame rate conversion command based in the identified progressive frame-to-interlaced field conversion technique to control a display frame rate and a number of times a de-interlaced frame is displayed, and transmits the frame rate conversion command to a frame rate conversion unit in the video processing unit.

29. A system according to claim 28 wherein the video processing unit displays the interlaced frame at the number commanded and outputs the progressive video signal at the display frame rate, which is an integral multiple of the frame rate of the identified progressive source such that motion judder is substantially reduced.

30. A progressive scan display system comprising:
(a) a signal receiving unit;
(b) a tuner box for transforming the signal into an analog signal;
(c) a video decoder for transforming the analog signal into a plurality of interlaced video fields;
(d) a de-interlacing system for converting the interlaced video fields into a progressive video signal, the de-interlacing system comprising:
  (i) a motion detection unit for generating a per-field motion pattern set for a subject video field, the motion pattern set comprising a same-parity motion pattern and an opposite-parity motion pattern pair;
  (ii) a progressive source identification unit comprising:
    (1) a plurality of progressive mode pattern pairs, each comprising a same-parity and an opposite-parity progressive mode pattern, wherein each progressive mode pattern pair is unique and characteristic of one of a plurality of progressive frame-to-interlaced field conversion techniques;
    (2) a motion data matching unit for comparing the same-parity and opposite-parity motion pattern pair for the subject video field with each progressive mode pattern pair to determine whether the subject video field is derived from a progressive source and to identify the progressive frame-to-interlaced field conversion technique used; and
    (3) a state machine unit for generating a command based on the comparison, the command to utilize a field-merging de-interlacing technique or a per-pixel de-interlacing technique to de-interlace the subject field to produce a progressive video signal; and
  (iii) a video processing unit for receiving and executing the command, and for outputting the progressive video signal; and
(e) a display for displaying the progressive video signal.

31. A de-interlacing system for de-interlacing an interlaced video signal comprising a plurality of even-parity and odd-parity video fields, the system comprising:
(a) a motion detection unit for generating a per-field motion pattern set for a subject video field, the motion pattern set comprising a same-parity motion pattern and an opposite-parity motion pattern pair;
(b) a progressive source identification unit comprising:
  (i) a plurality of progressive mode pattern pairs, each comprising a same-parity and an opposite-parity progressive mode pattern, wherein each progressive mode pattern pair is unique and characteristic of one of a plurality of progressive frame-to-interlaced field conversion techniques;
  (ii) a motion data matching unit for comparing the same-parity and opposite-parity motion pattern pair for the subject video field with each progressive mode pattern pair to determine whether the subject video field is derived from a progressive source and to identify the progressive frame-to-interlaced field conversion technique used; and
  (iii) a state machine unit for generating, based on the comparison, a first command to utilize a field-merging de-interlacing technique or a per-pixel de-interlacing technique to de-interlace the subject field to produce a progressive video signal, and a second command to control the display frame rate of the progressive video signal and a number of times to display a de-interlaced frame, wherein the display frame rate is an integral multiple of the frame rate of the progressive source such that motion judder is substantially reduced; and
(c) a video processing unit for receiving and executing the command, and for outputting the progressive video signal.

32. A method of de-interlacing an interlaced video signal comprising a plurality of even-parity and odd-parity video fields, the method comprising:
(a) generating a per-field motion pattern set for a subject video field, the per-field motion pattern set comprising a same-parity and an opposite-parity motion pattern pair;
(b) providing a plurality of progressive mode pattern pairs, each comprising a same-parity and an opposite-parity progressive mode pattern, wherein each progressive mode pattern pair is unique and characteristic of one of a plurality of progressive frame-to-interlaced field conversion techniques;
(c) comparing the same-parity and opposite-parity motion pattern pair for the subject video field with each progressive mode pattern pair to determine whether the subject video field is derived from a progressive source and to identify the progressive frame-to-interlaced field conversion technique used;
(d) based on the comparison, utilizing a field-merging de-interlacing technique or a per-pixel de-interlacing technique to de-interlace the subject field to produce a progressive video signal; and
(e) based on the comparison, adjusting a display frame rate of the progressive video signal and a number of times to display a de-interlaced frame, wherein the adjusted display frame rate is an integral multiple of the frame rate of the progressive source such that motion judder is substantially reduced.

* * * * *